United States Patent
Chen et al.

(10) Patent No.: US 12,032,259 B2
(45) Date of Patent: Jul. 9, 2024

(54) ARRAY SUBSTRATE AND DISPLAY PANEL

(71) Applicant: TCL CHINA STAR OPTOELECTRONICS TECHNOLOGY CO., LTD., Shenzhen (CN)

(72) Inventors: Xingwu Chen, Shenzhen (CN); Mei Chen, Shenzhen (CN); Qi Song, Shenzhen (CN); Dongze Li, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/440,123

(22) PCT Filed: Jul. 19, 2021

(86) PCT No.: PCT/CN2021/107166
§ 371 (c)(1),
(2) Date: Sep. 16, 2021

(87) PCT Pub. No.: WO2022/267122
PCT Pub. Date: Dec. 29, 2022

(65) Prior Publication Data
US 2024/0036421 A1    Feb. 1, 2024

(30) Foreign Application Priority Data
Jun. 21, 2021  (CN) .......................... 202110687342.5

(51) Int. Cl.
G02F 1/1368    (2006.01)
G02F 1/1362    (2006.01)

(52) U.S. Cl.
CPC ...... *G02F 1/1368* (2013.01); *G02F 1/136286* (2013.01)

(58) Field of Classification Search
CPC .......................... G02F 1/1368; G02F 1/136218
See application file for complete search history.

(56) References Cited

U.S. PATENT DOCUMENTS 9,069,204 B2 * 6/2015 Zhou ................... G02F 1/13338

FOREIGN PATENT DOCUMENTS

| CN | 102200664 A | 9/2011 |
|---|---|---|
| CN | 105911776 A | 8/2016 |

(Continued)

OTHER PUBLICATIONS

International Search Report in International application No. PCT/CN2021/107166,mailed on Mar. 24, 2022.

(Continued)

*Primary Examiner* — Joseph L Williams
(74) *Attorney, Agent, or Firm* — PV IP PC; Wei Te Chung; Zhigang Ma

(57) ABSTRACT

An array substrate and a display panel are provided. Pixel units of the array substrate include a thin film transistor region, pixel electrode regions, thin film transistors disposed in the thin film transistor region, and pixel electrodes disposed in the pixel electrode regions. The pixel electrode is electrically connected to the thin film transistor. Meanwhile, a shielding member is further disposed in the thin film transistor region, and an interval between the shielding member and the pixel electrode in an extending direction of data lines is a first threshold value.

20 Claims, 15 Drawing Sheets

(56) References Cited

FOREIGN PATENT DOCUMENTS

| | | | |
|---|---|---|---|
| CN | 106647058 A | 5/2017 |
| CN | 106990631 A | 7/2017 |
| CN | 107340655 A | 11/2017 |
| CN | 107526219 A | 12/2017 |
| CN | 111308807 A | 6/2020 |
| CN | 111308809 A | 6/2020 |
| CN | 111338134 A | 6/2020 |
| CN | 111352279 A | 6/2020 |
| CN | 111443527 A | 7/2020 |
| CN | 111474775 A | 7/2020 |
| CN | 111474789 A | 7/2020 |
| KR | 20170097263 A | 8/2017 |

OTHER PUBLICATIONS

Written Opinion of the International Search Authority in International application No. PCT/CN2021/107166, mailed on Mar. 24, 2022.

Chinese Office Action issued in corresponding Chinese Patent Application No. 202110687342.5 dated Aug. 2, 2022, pp. 1-8.

* cited by examiner

ARRAY SUBSTRATE AND DISPLAY PANEL

RELATED APPLICATIONS

This application is a Notional Phase of PCT Patent Application No. PCT/CN2021/107166 having international filing date of Jul. 19, 2021, which claims the benefit of priority of Chinese Patent Application No. 202110687342.5 filed on Jun. 21, 2021. The contents of the above applications are all incorporated by reference as if fully set forth herein in their entirety.

BACKGROUND OF INVENTION

Field of Invention

The present application relates to a field of display, and particularly relates to an array substrate and a display panel.

Description of Prior Art

Liquid crystal displays (LCDs) are display products used most widely on the market currently, production technology of the LCDs is mature and has high yield, low production cost, and high market acceptance.

In current liquid crystal displays, pixel electrodes on a side of array substrates are often designed in a star shape and are divided into a plurality of regions to improve characteristics of viewing angles. However, because a part of pixel electrodes near pixel driving regions is affected by voltages of metal layers such as gate electrodes, source electrodes, or drain electrodes in thin film transistors, voltages of the pixel electrodes in these regions are caused to be inaccurate, which leads to a technical problem of abnormal liquid crystal alignment.

Therefore, an array substrate and a display panel are intensively required to solve the aforesaid problem.

SUMMARY OF INVENTION

The present application provides an array substrate and a display panel to remedy the technical problem of abnormal alignment caused by an inaccurate alignment voltage of the pixel electrodes of current display panels.

The present application provides an array substrate. The array substrate includes a plurality of scanning lines and a plurality of data lines. A plurality of pixel units are enclosed by the plurality of scanning lines and the plurality of data lines. The pixel units include a thin film transistor region and pixel electrode regions.

The pixel units include a thin film transistor layer disposed in the thin film transistor region and a pixel electrode layer disposed in the pixel electrode regions. The pixel electrode layer includes a pixel electrode. The thin film transistor layer includes a thin film transistor. The pixel electrode is electrically connected to the thin film transistor.

Wherein the pixel units further include a shielding member disposed in the thin film transistor region, in a first direction, an interval between the shielding member and the pixel electrode is a first threshold value, and the first direction is parallel to an extending direction of the data lines.

In the array substrate of the present application, the pixel electrode includes a main electrode and a plurality of branch electrodes connected to the main electrode, the main electrode includes a first main electrode and a second main electrode, the first main electrode and the second main electrode separate the pixel electrode regions into a plurality of pixel electrode sub-regions, the branch electrodes are disposed in the pixel electrode sub-regions, each of the branch electrodes is disposed with the first main electrode or the second main electrode at a first preset angle; and wherein the branch electrodes in two adjacent pixel electrode sub-regions are disposed asymmetrically.

In the array substrate of the present application, the array substrate further includes a plurality of shielding main lines located on the data lines, the shielding main lines are disposed parallel to the data lines, one of the shielding main lines corresponds to one of the data lines; and wherein the shielding member includes a first shielding line connected to two adjacent shielding main lines, and in the first direction, an interval between the first shielding line and the pixel electrode is the first threshold value.

In the array substrate of the present application, the pixel electrode further includes peripheral electrodes located on a periphery of the pixel electrodes, the peripheral electrodes are connected to the first main electrode, the second main electrode, and the branch electrodes; and wherein the shielding member extends toward the pixel electrode regions and is electrically connected to at least one of the peripheral electrodes, the main electrode, or the branch electrodes.

In the array substrate of the present application, the pixel electrode includes at least one first peripheral electrode disposed along the extending direction of the data lines, the shielding member includes a plurality of first shielding leads, one end of the first shielding leads extends toward the pixel electrode regions and is connected to the branch electrodes and the first peripheral electrode, another end of the first shielding leads extends to a contact hole in the thin film transistor and is connected to the thin film transistor.

In the array substrate of the present application, the pixel electrode includes at least one first peripheral electrode disposed along the extending direction of the data lines, the shielding member includes a second shielding line disposed along an extending direction of the scanning lines, the second shielding line corresponds to one of the pixel electrode sub-regions, and the second shielding line is disposed spaced apart to the branch electrodes in a corresponding pixel electrode sub-region; and wherein ends of one of the first peripheral electrodes or/and one of the first main electrode extend to the thin film transistor region and are connected to the second shielding line.

In the array substrate of the present application, the shielding member includes a plurality of second shielding leads, one end of the second shielding leads is connected to the second shielding line, another end of the second shielding leads extends to the contact hole in the thin film transistor and is connected to the thin film transistor.

In the array substrate of the present application, the pixel electrode includes at least one second peripheral electrode disposed along the extending direction of the scanning lines, the second peripheral electrode is parallel to the second shielding line; and wherein the second peripheral electrode is connected to at least one of the branch electrodes, the first main electrode, or the first peripheral electrode.

In the array substrate of the present application, the pixel electrode includes at least one second peripheral electrode disposed along an extending direction of the scanning lines, intervals between the second peripheral electrodes and the second main electrode in two adjacent pixel electrode sub-regions are different.

In the array substrate of the present application, the pixel units include the pixel electrode regions located on two sides of the thin film transistor region, structures of the pixel electrodes in two of the pixel electrode regions in one same pixel electrode unit are different.

The present application further provides a display panel, wherein the display panel includes an array substrate, a color film substrate, and a liquid crystal layer located between the array substrate and the color film substrate.

Wherein, the array substrate includes a plurality of scanning lines and a plurality of data lines, a plurality of pixel units are enclosed by the plurality of scanning lines and the plurality of data lines, the pixel units include a thin film transistor region and pixel electrode regions;

the pixel units include a thin film transistor layer disposed in the thin film transistor region and a pixel electrode layer disposed in the pixel electrode regions, the pixel electrode layer includes a pixel electrode, the thin film transistor layer includes a thin film transistor, and the pixel electrode is electrically connected to the thin film transistor.

Wherein, the pixel units further include a shielding member disposed in the thin film transistor region, in a first direction, an interval between the shielding member and the pixel electrode is a first threshold value, and the first direction is parallel to an extending direction of the data lines.

In the display panel of the present application, the pixel electrode includes a main electrode and a plurality of branch electrodes connected to the main electrode, the main electrode includes a first main electrode and a second main electrode, the first main electrode and the second main electrode separate the pixel electrode regions into a plurality of pixel electrode sub-regions, the branch electrodes are disposed in the pixel electrode sub-regions, each of the branch electrodes is disposed with the first main electrode or the second main electrode at a first preset angle; and wherein the branch electrodes in two adjacent pixel electrode sub-regions are disposed asymmetrically.

In the display panel of the present application, the array substrate further includes a plurality of shielding main lines located on the data lines, the shielding main lines are disposed parallel to the data lines, one of the shielding main lines corresponds to one of the data lines; and wherein the shielding member includes a first shielding line connected to two adjacent shielding main lines, and in the first direction, an interval between the first shielding line and the pixel electrode is the first threshold value.

In the display panel of the present application, the pixel electrode further includes peripheral electrodes located on a periphery of the pixel electrodes, the peripheral electrodes are connected to the first main electrode, the second main electrode, and the branch electrodes; and wherein the shielding member extends toward the pixel electrode regions and is electrically connected to at least one of the peripheral electrodes, the main electrode, or the branch electrodes.

In the display panel of the present application, the pixel electrode comprises at least one first peripheral electrode disposed along the extending direction of the data lines;

the shielding member includes a plurality of first shielding leads, one end of the first shielding leads extends toward the pixel electrode regions and is connected to the branch electrodes and the first peripheral electrode, another end of the first shielding leads extends to a contact hole in the thin film transistor and is connected to the thin film transistor.

In the display panel of the present application, the pixel electrode includes at least one first peripheral electrode disposed along the extending direction of the data lines;

the shielding member includes a second shielding line disposed along an extending direction of the scanning lines, the second shielding line corresponds to one of the pixel electrode sub-regions, and the second shielding line is disposed spaced apart to the branch electrodes in a corresponding pixel electrode sub-region; and wherein ends of one of the first peripheral electrodes or/and one of the first main electrode extend to the thin film transistor region and are connected to the second shielding line.

In the display panel of the present application, the shielding member includes a plurality of second shielding leads, one end of the second shielding leads is connected to the second shielding line, another end of the second shielding leads extends to the contact hole in the thin film transistor and is connected to the thin film transistor.

In the display panel of the present application, the pixel electrode includes at least one second peripheral electrode disposed along the extending direction of the scanning lines, the second peripheral electrode is parallel to the second shielding line; and wherein the second peripheral electrode is connected to at least one of the branch electrodes, the first main electrode, or the first peripheral electrode.

In the display panel of the present application, the pixel electrode includes at least one second peripheral electrode disposed along an extending direction of the scanning lines, intervals between the second peripheral electrodes and the second main electrode in two adjacent pixel electrode sub-regions are different.

In the display panel of the present application, the pixel units include the pixel electrode regions located on two sides of the thin film transistor region, structures of the pixel electrodes in two of the pixel electrode regions in one same pixel electrode unit are different.

The present application provides a pixel driving circuit and a display panel. The pixel driving circuit includes N cascaded pixel driving units. Each of the pixel driving units includes a light-emitting module, a switch module received an nth-stage first control signal, a detection module received an nth-stage second control signal, and a reset module received an nth-stage reset signal. An output terminal outputted a mth-stage control signal received the nth-stage reset signal, which allows the control signal passing through the stage in advance to allow the nth-stage reset module to work, while a mth-stage light-emitting module is working. Therefore, an electric potential of an anode terminal of a light-emitting device in the light-emitting module is reset to a threshold electric potential, which increases a reset time of the reset module resetting the electric potential of the anode terminal, allows the electric potential of the anode terminal of the light-emitting device to be raised to a threshold electric potential, and improves display uniformity of the display panel.

DETAILED DESCRIPTION OF PREFERRED EMBODIMENTS

Figure 1:
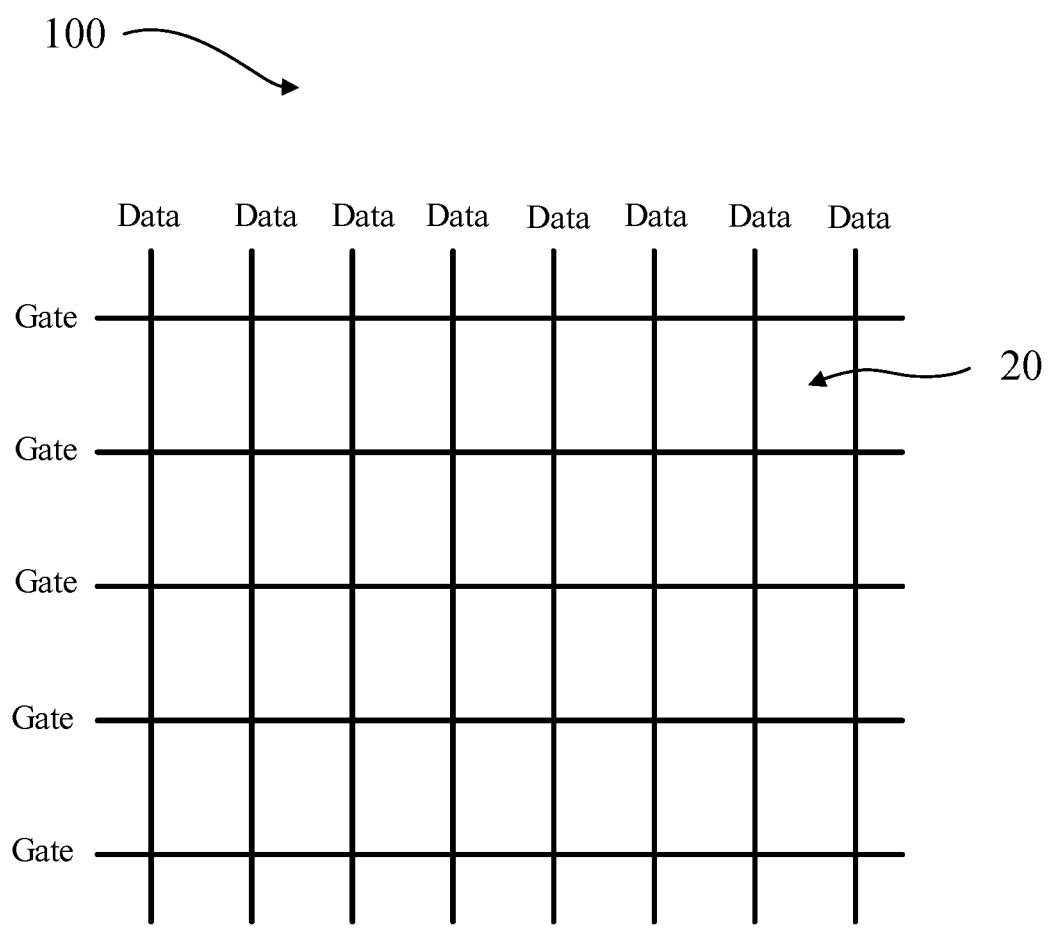
FIG. 1 is a top view structural diagram of an array substrate of the present application.

For making the purposes, technical solutions and effects of the present application be clearer and more definite, the present application will be further described in detail below. It should be understood that the specific embodiments described herein are merely for explaining the present application and are not intended to limit the present application.

Please refer to FIG. 1 to FIG. 16. The present application provides an array substrate 100. The array substrate 100 includes a plurality of scanning lines Gate and a plurality of data lines Date. The plurality of pixel units 20 are enclosed by the plurality of scanning lines Gate and the plurality of data lines Date. The pixel units 20 include a thin film transistor region 30 and pixel electrode regions 40

In this embodiment, the pixel units 20 include a thin film transistor layer 12 disposed in a thin film transistor region 30 and a pixel electrode layer 13 disposed in the pixel electrode regions 40, the pixel electrode layer 13 includes a pixel electrode 50, the thin film transistor layer 12 includes a thin film transistor 60, and the pixel electrode 50 is electrically connected to the thin film transistor 60.

In this embodiment, the pixel units 20 further include a shielding member 70 disposed in the thin film transistor region 30, in a first direction, an interval L between the shielding member and the pixel electrode 50 is a first threshold value, and the first direction is parallel to an extending direction of the data lines Date.

In the embodiment, the first threshold value is not specifically limited in the application, and it can be 0 or a certain value greater than 0. When the first threshold value is 0, the shielding member 70 is connected to the pixel electrode 50. When the first threshold is the certain value greater than 0, the shielding member 70 and the pixel electrode 50 are disposed separately.

The present application provides the array substrate 100 and a display panel. The array substrate 100 includes a plurality of scanning lines Gate and a plurality of data lines Date. The plurality of pixel units 20 are enclosed by the plurality of scanning lines Gate and the plurality of data lines Date. The pixel units 20 include a thin film transistor region 30, a pixel electrode region 40, thin film transistors 60 disposed in the thin film transistor region 30, and pixel electrodes 50 disposed in the pixel electrode 40. The pixel electrode 50 is electrically connected to the thin film transistor 60. Meanwhile, the shielding member 70 is further disposed in the thin film transistor region 30 in the present application. Furthermore, the interval L between the shielding member 70 and the pixel electrode 50 in an extending direction of the data line Date is the first threshold value, which allows the shielding member 70 to shield a voltage of a metal layer in the thin film transistor 60 disposed close to the pixel electrode region 40, prevents the metal layer of the thin film transistor 60 from affecting an alignment voltage of the pixel electrode 50, and remedies the technical problem of abnormal alignment of the pixel electrode 50 in the region due to inaccurate alignment voltage.

It should be noted that the shielding member 70 and the pixel electrode 50 can be disposed on a same layer or different layers, which is not specifically limited in the present application. The shielding member 70 and the pixel electrode 50 being disposed in the same layer is described as follow.

Now, the technical solutions of the present application are described with reference to specific embodiments.

The pixel electrode 50 of the present application can have 4-domain partitions or 8-domain partitions. In embodiments hereinafter, the technical solution of the present application is described by taking the 4-domain partitions as an example.

In current liquid crystal display panels, pixel electrodes 50 generally include a main electrode 510 and branch electrodes 530. The main electrode 510 divides the pixel electrode 50 into a plurality of regions. Under effect of an electric field and a chiral auxiliary reagent, liquid crystals converge to the main electrode 510, and the branch electrodes 530 in adjacent region are disposed symmetrically. When the liquid crystals converge to the main electrode 510, directions of rotation of the liquid crystals in the adjacent regions conflict, thus many darkness patterns appear.

Please refer to FIG. 2 to FIG. 16. The main electrode 50 includes a first main electrode 511, a second main electrode 512, and a peripheral electrode 520. The first main electrode 511 and the second main electrode 512 separate the pixel electrode regions 40 into a plurality of pixel electrode sub-regions. In the pixel electrode sub-regions, a plurality of branch electrodes 530 electrically connected to the first main electrode 511 and the second main electrode 51 are disposed. Each of the branch electrodes 530 is disposed with the first main electrode 511 or the second main electrode 512 at a first preset angle. The branch electrodes 530 in two adjacent pixel electrode sub-regions are disposed asymmetrically.

In this embodiment, the first main electrode 511 can be disposed parallel to an extending direction of the data lines Date, the second main electrode 512 can be disposed parallel to an extending direction of the scanning lines Gate, i.e., the first main electrode 511 is perpendicular to the second main electrode 512. Please refer to FIG. 2 to FIG. 16. The first main electrode 511 and the second main electrode 512 can divide the pixel electrode 50 into a first pixel electrode sub-region 410, a second pixel electrode sub-region 420, a third pixel electrode sub-region 430, and a fourth pixel electrode sub-region 440. The branch electrodes 530 in two adjacent pixel electrode sub-regions are disposed asymmetrically. Because the branch electrodes 530 in the adjacent pixel electrode sub-regions are disposed asymmetrically, included angles formed from the branch electrodes 530 in the adjacent pixel electrode sub-regions corresponding to the first main electrode 511 or the second main electrode 51 are different.

In this embodiment, the peripheral electrode 520 can include at least one first peripheral electrode 521 and/or at least one second peripheral electrode 522. The first peripheral electrode 521 is disposed along the direction of the data lines Date. The second peripheral electrode 522 is disposed along the direction of the scanning lines Gate. That is, the first peripheral electrode 521 can be disposed parallel to the data lines Date, the second peripheral electrode 522 is disposed parallel to the scanning lines Gate, the first peripheral electrode 521 can be connected to the branch electrode 530 and the second main electrode 512, and the second peripheral electrode 522 can be connected to the branch electrode 530 and the first main electrode 511.

In this embodiment, the branch electrodes 530 in the two adjacent pixel electrode sub-regions are disposed asymmetrically, which prevents the technical problem of conflicting of the liquid crystals corresponding to the adjacent pixel electrode sub-regions in the rotating direction when the liquid crystal converges on the main electrode 510, and improves light transmittance of a structure of the pixel electrode 50, and improves brightness uniformity between different pixel electrode sub-regions.

Figure 2:
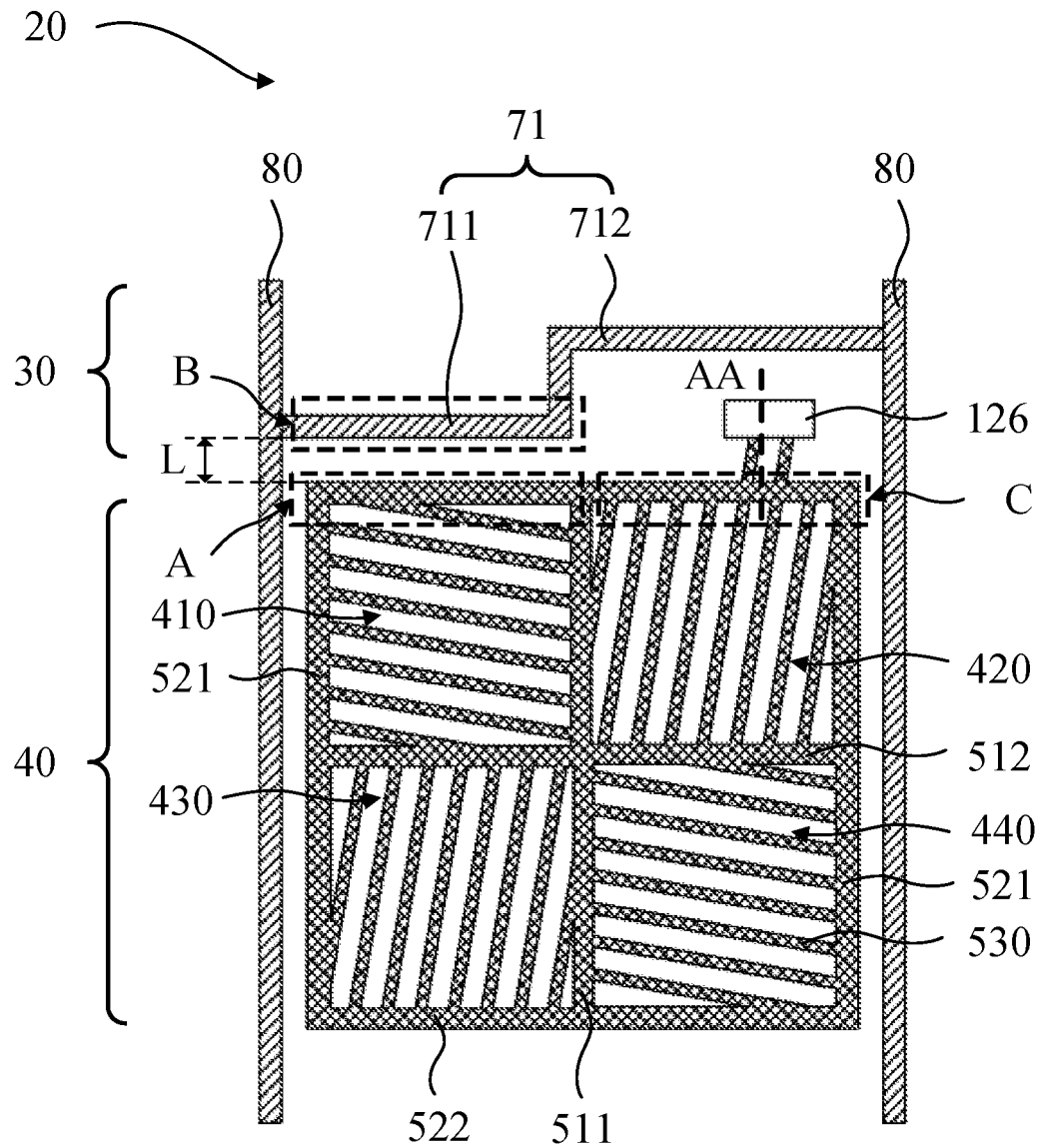
FIG. 2 is a structural diagram of pixel units in a first embodiment of the present application.

Please refer to FIG. 2. FIG. 2 is a first structural diagram of the pixel units 20 in a first embodiment of the present application.

The branch electrodes 530 in two adjacent pixel electrode sub-regions disposed asymmetrically by the structure illustrated in FIG. 2 can improve brightness uniformity between different pixel electrode sub-region, though. However, because the branch electrodes 530 and the peripheral electrode 520 of the pixel electrode 50 are disposed at a small angle, for example, referring to FIG. 2, the region A is the region where the angle between the branch electrode 530 and the peripheral electrode 520 is less than 45°, and the region C is the region where the angle between the branch electrode 530 and the peripheral electrode 520 is greater than 45°, a direction of an electric field and appearance in the region A are different from a direction of the electric field and appearance in the region C, and the appearance in the small-angle region is worse, appearance is prone to be abnormal. In addition, a region B is the region where the metal layer of the thin film transistor 60 is located close to the region A. The metal layer in the region B affects the alignment voltage of the branch electrode 530 in the region A, so that liquid crystal alignment is abnormal incurred by the branch electrode 530 in the region A having inaccurate alignment voltage.

Please refer to FIG. 2. The array substrate 100 further includes a plurality of shielding main lines 80 located on the data lines Date. The shielding main lines 80 are disposed parallel to the data lines Date. One of the shielding main lines 80 corresponds to one of the data lines Date. The shielding main line 80 can be disposed on a same layer with the pixel electrode 50, and the shielding main line 80 can be formed in a same process with the pixel electrode 50. In a top view direction of the array substrate 100, the shielding main line 80 can be disposed overlapped to the data lines Date, i.e., the shielding main line 80 is configured to shield the data line Date to shield influence of deflection of the liquid crystals from the data line Date.

In this embodiment, the shielding main line 80 is grounded.

In this embodiment, the array substrate 100 further includes a first shielding line 71 composing the shielding member 70. The first shielding line 71 is connected to two adjacent shielding main lines 80. Wherein, in the extending direction of the data lines Date, a smallest interval L between the first shielding line 71 and the branch electrode 530 is less than 6 μm.

Figure 3:
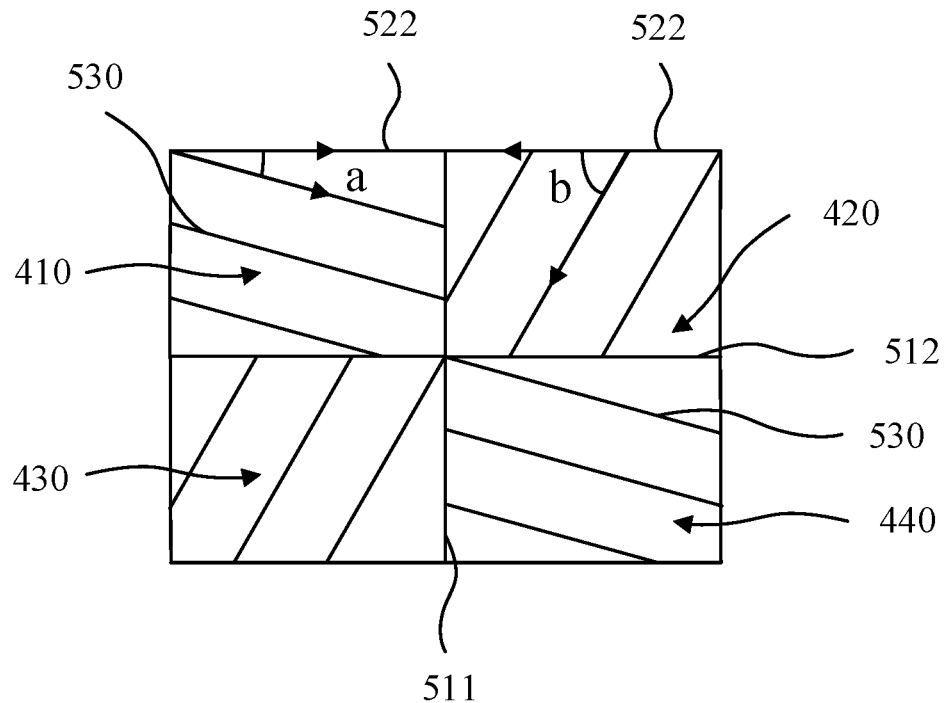
FIG. 3 is a simplified diagram of the pixel units in the first embodiment of the present application.

Please refer to FIG. 2 and FIG. 3. An included angle a between the branch electrode 530 and the second peripheral electrode 522 in the first pixel electrode sub-region 410 in the extending direction is less than an included angle b between the branch electrode 530 and the second peripheral electrode 522 in the second pixel electrode sub-region 420 in the extending direction, i.e., the branch electrode 530 and the second peripheral electrode 522 in the first pixel electrode sub-region 410 are disposed at a small angle.

It should be noted that the extension direction of the branch electrode is toward the main electrode connected to the branch electrode, and the extension direction of the peripheral electrode is toward the main electrode connected to the peripheral electrode. For example, please refer to FIG. 2 and FIG. 3. The branch electrodes 530 in the first pixel electrode sub-region 410 and in the second pixel electrode sub-region 420 are both connected to the first main electrode 511. Therefore, the extending direction of the branch electrodes 530 in the first pixel electrode sub-region 410 and in the second pixel electrode sub-region 420 is toward the first main electrode 511, and the second peripheral electrodes 522 in the first pixel electrode sub-region 410 and in the second pixel electrode sub-region 420 are both connected to the first main electrode 511. Therefore, the extending direction of the second peripheral electrodes 522 in the first pixel electrode sub-region 410 and in the second pixel electrode sub-region 420 is toward the first main electrode 511. The specific toward directions and the included angles are illustrated as FIG. 3.

The first shielding line 71 can include a first connection segment 711 disposed close to the pixel electrode region 40 and a second connection segment 712 disposed away from the pixel electrode region 40. The first connection segment 711 corresponds to the first pixel electrode sub-region 410. The second connection segment 712 corresponds to the second pixel electrode sub-region 420. A smallest interval L between the first connection segment 711 and the second peripheral electrode 522 is a first threshold value. The first threshold value can be any value less than 6 μm and greater than 0.

In this embodiment, because the included angle between the branch electrode 530 and the second peripheral electrode 522 in the second pixel electrode sub-region 420 is greater than 45°, the influence of the metal layer in the thin film transistor 60 on the alignment voltage of the branch electrode 530 in the region C is smaller. Wherein, the branch electrode 530 in the second pixel electrode sub-region 420 extends to a contact hole 126, and the pixel electrode 50 is electrically connected to the thin film transistor 60 through the contact hole 126.

Figure 4:
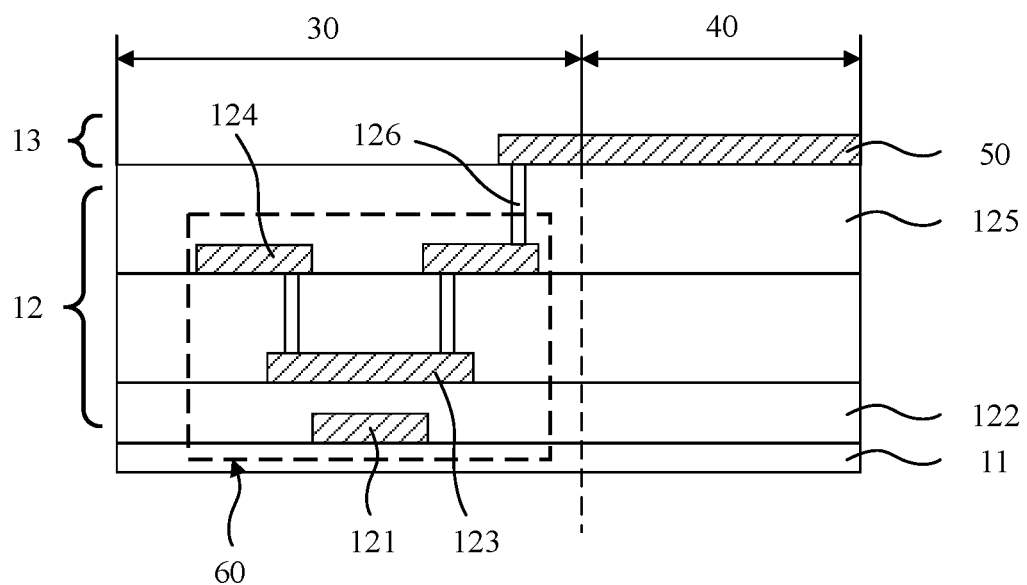
FIG. 4 is a sectional diagram of a cross section AA in FIG. 2.

Please refer to FIG. 4. FIG. 4 is a sectional diagram of a cross section AA in FIG. 2.

The array substrate 100 can include a substrate 11 and a thin film transistor layer 12 located on the substrate 11. A material of the substrate can be made of a material such as glass, quartz, or polyimide, etc. The thin film transistor layer 12 includes a plurality of thin film transistors 60. The thin film transistors 60 can be a structure of an etch-stop type, back-channel-etch, or a top-gate thin film transistor type, etc., which is not limited specifically. For example, the thin film transistors 60 of a bottom-gate thin film transistor type can include a gate electrode layer 121 located on the substrate 11, a gate insulation layer 122 located on the gate layer 121, a gate insulation layer 122 located on the gate insulation layer 122, a semiconductor layer 123 located on the gate insulation layer 122, a source drain electrode layer 124 located on the semiconductor layer 123, and a passivation layer 125 located on the source drain layer 124. Wherein, the gate electrode layer 121 can include a gate electrode and the scanning lines Gate, the source drain electrode layer 124 can include a source electrode, a drain electrode, and data lines Date, etc., the contact hole 126 is formed on the passivation layer 125, the pixel electrode 50 is connected to the source electrode and the drain electrode of the thin film transistor 60 through the contact hole 126.

In this embodiment, because the metal layer in the region B has a certain influence on the alignment voltage of the branch electrode 530 in the region A, the first connection segment 711 of the first shielding line 71 is disposed close to the region A in the present application. Furthermore, the metal layer of the thin film transistor 60 close to the region A is shielded by the first connecting section 711, which remedies the influence of the metal layer of the thin film transistor 60 on the alignment voltage of the branch electrode 530 in the region A, and remedies the technical problem of abnormal alignment due to inaccurate alignment voltage of the branch electrode 530 in the region A.

Figure 5:
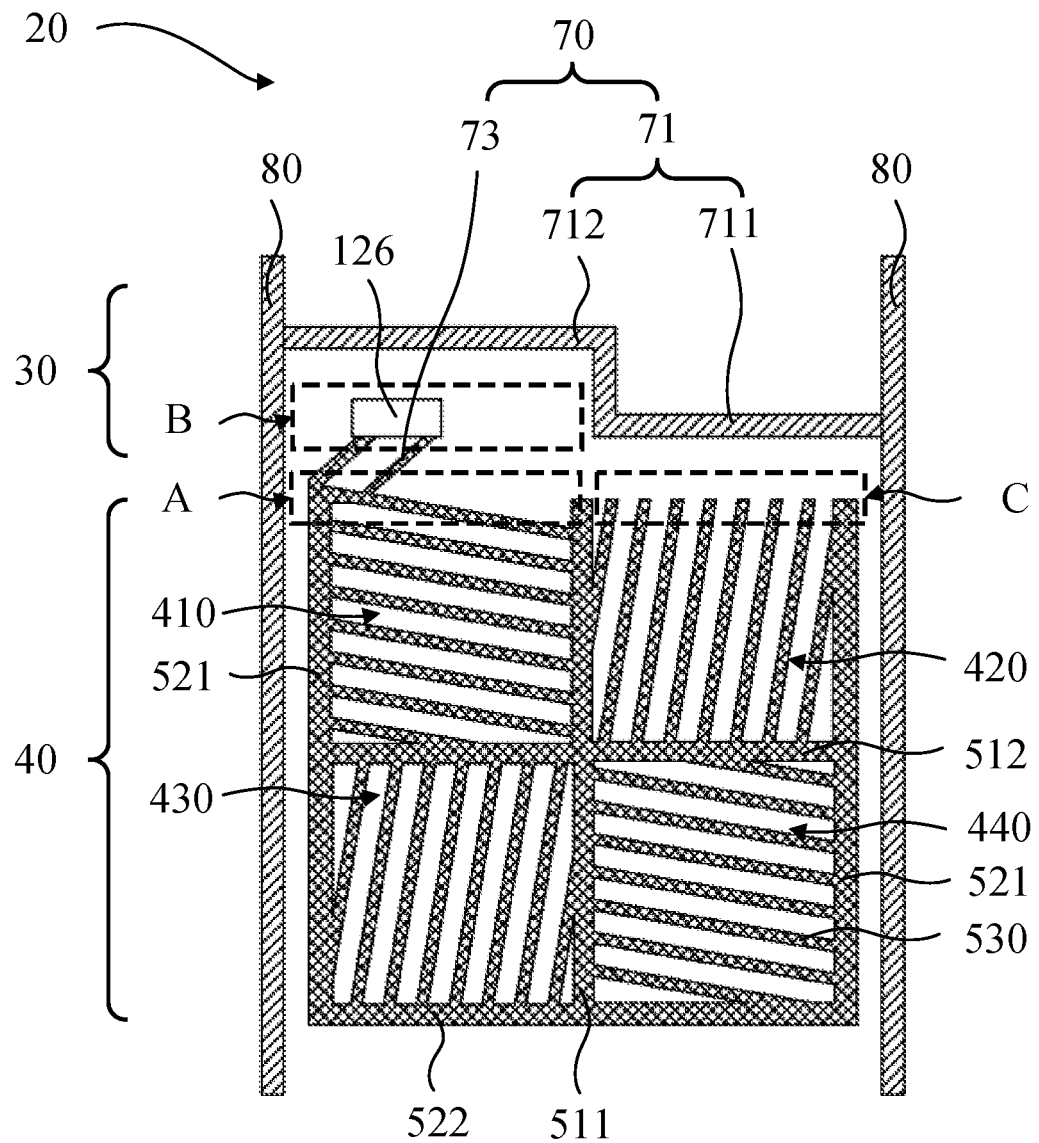
FIG. 5 is a first structural diagram of the pixel units in a second embodiment of the present application.

Please refer to FIG. 5. FIG. 5 is a first structural diagram of the pixel units 20 in a second embodiment of the present application.

The peripheral electrode 50 includes two first peripheral electrodes 521 and one second peripheral electrode 522 disposed at periphery of the peripheral electrode 50. The two first peripheral electrodes 521 are located on two sides of the first main electrode 511 and are connected to the branch electrodes 530 in four pixel electrode sub-regions. One second peripheral electrode 522 is connected to the branch electrodes 530 in the third electrode sub-region 430 and the fourth pixel electrode sub-region 440.

In this embodiment, the pixel units 20 further include a plurality of first shielding leads 73 composing the shielding member 70. One end of the first shielding leads 73 extends toward the pixel electrode regions 40 and is directly connected to the branch electrodes 530 and the first peripheral electrode 521. Another end of the first shielding leads 73 extends to a contact hole 126 in the thin film transistor 60 and is connected to the thin film transistor 60.

Compared to the structure in FIG. 2, the structure illustrated in FIG. 5 is equivalent to removing one second peripheral electrode 522 close to the thin film transistor region 30, i.e., the second peripheral electrode 522 in the first pixel electrode sub-region 410 and the second pixel electrode sub-region 420 is removed, and a position of the contact hole 126 is moved to a region corresponding to the first pixel electrode sub-region 410, and the branch electrodes 530 in the first pixel electrode sub-region 410 extend toward the contact hole 126 and are connected to the thin film transistor 60. Therefore, in this embodiment, the plurality of first shielding leads 73 are equivalent to extension lines of the branch electrodes 530 in the first pixel electrode sub-region 410.

In this embodiment, because the metal layer in the region B has a certain influence on the alignment voltage of the branch electrode 530 in the region A, the second peripheral electrodes 522 in the region A are removed in the present application, which prevents the branch electrodes 530 and the peripheral electrodes 520 in the region A from being disposed at a small angle and improves the appearance of the branch electrodes 530 in the region A. Secondly, the presence of the second shielding lines 72 shields the electric field formed from the metal layer in the region B, weakens influence on the alignment voltage of the branch electrode 530 in the region A, and remedies the technical problem of abnormal alignment due to inaccurate alignment voltage of the branch electrodes 530 in the region A.

Figure 6:
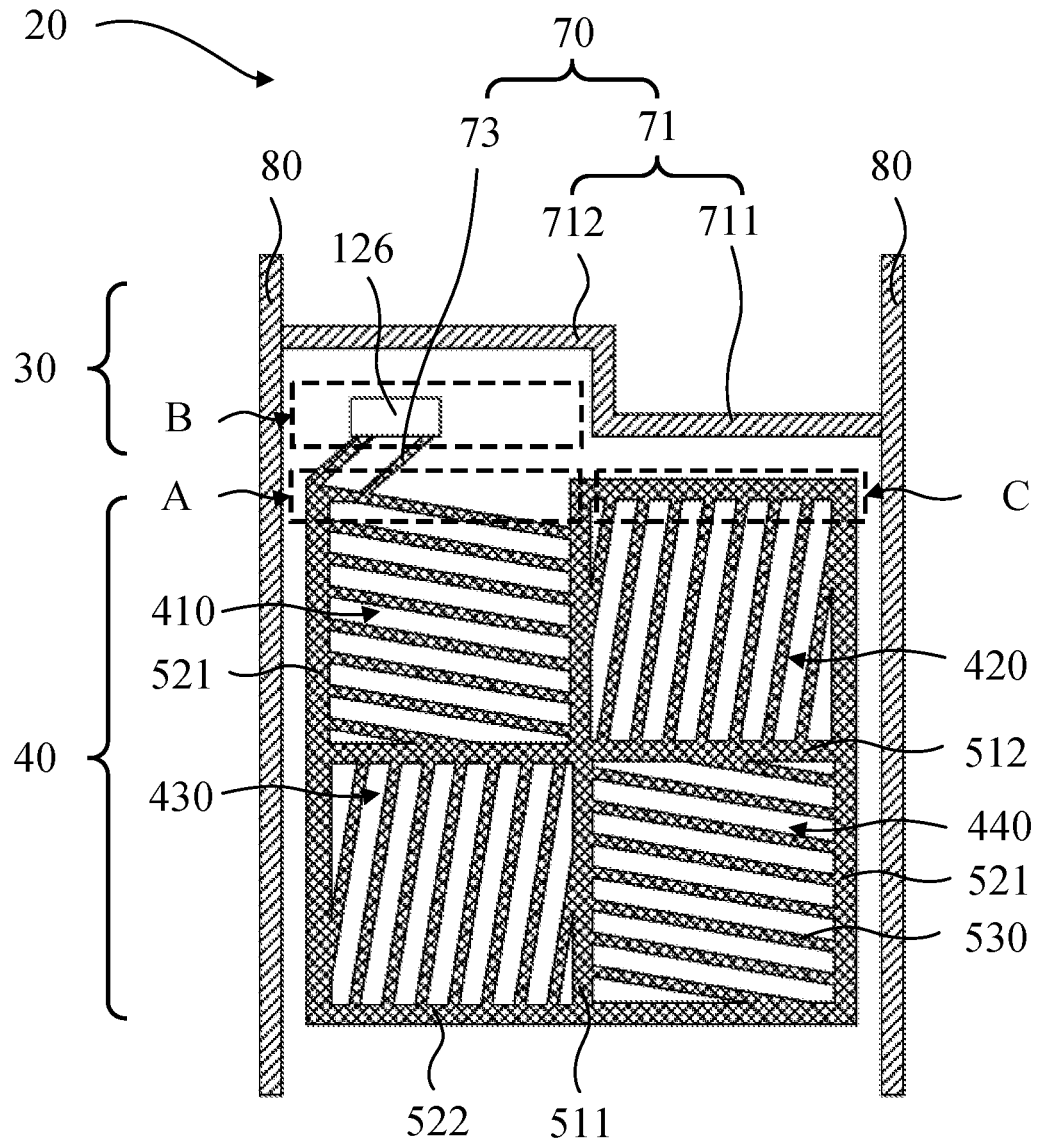
FIG. 6 is a second structural diagram of the pixel units in the second embodiment of the present application.

Please refer to FIG. 6. FIG. 6 is a second structural diagram of the pixel units 20 in a second embodiment of the present application.

The peripheral electrode 50 includes two first peripheral electrodes 521 and two second peripheral electrodes 522 disposed at periphery of the peripheral electrode 50. Wherein, lengths of the two second peripheral electrodes 522 are different.

Compared to the structure illustrated in FIG. 5, in this embodiment, one second peripheral electrode 522 is disposed in the second pixel electrode sub-region 420, and a part of the branch electrodes 530 in the second pixel electrode sub-region 420 is directly connected to the second peripheral electrodes 522. As the included angle between the second peripheral electrode 522 and the branch electrode 530 in the second pixel electrode sub-region 420 is greater than 45°, and the interval between the branch electrode 530 in the region C and the region B is greater than the interval between the branch electrode 530 in the region A and the region B, the influence of the metal layer in the region B on the voltage of the branch electrode 530 in the region C is smaller than the influence of the metal layer in the region B on the voltage of the branch electrode 530 in the region A. Furthermore, the second peripheral electrodes 522 in the second pixel electrode sub-region 420 also serve a certain effect of shielding the metal layer in the adjacent thin film transistor region 30. Accuracy of the voltage of the branch electrodes 530 in the region C is further ensured.

Figure 7:
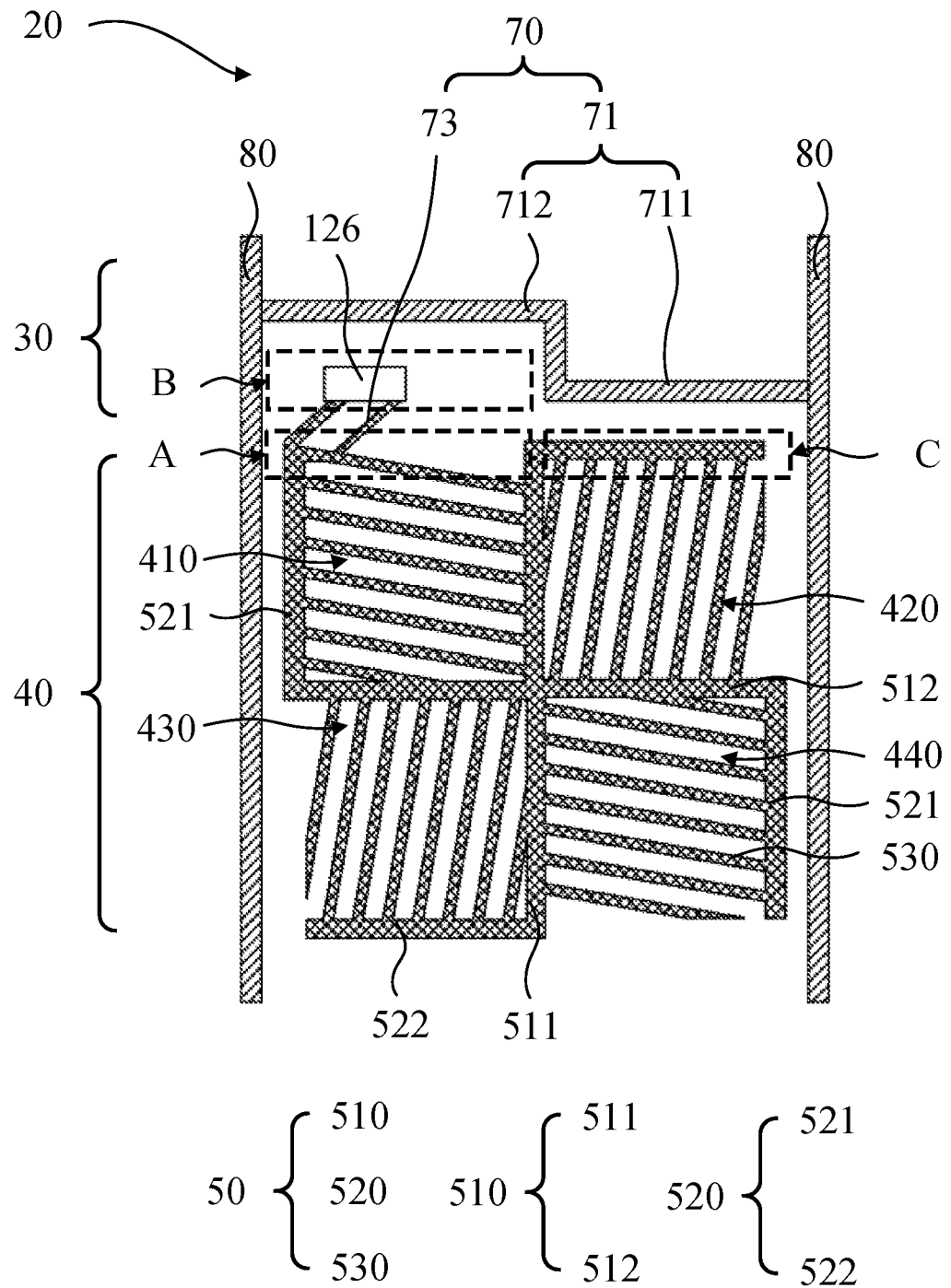
FIG. 7 is a third structural diagram of the pixel units in the second embodiment of the present application.

Please refer to FIG. 7. FIG. 7 is a third structural diagram of the pixel units 20 in the second embodiment of the present application.

The structure of FIG. 7 is similar to the structure of FIG. 6, and the difference between them is that compared to the structure of FIG. 6, in this embodiment, the first peripheral electrode 521 in the second pixel electrode sub-region 420, the first peripheral electrode 521 in the third pixel electrode sub-region 430, and the second peripheral electrode 522 in the fourth pixel electrode sub-region 440 in the pixel units 20 are further removed, i.e., disposing branches in the corresponding pixel electrode sub-regions and the peripheral electrodes 520 at a small angle is prevented, appearance of abnormal alignment easily appearing is remedied, and accuracy of the alignment is improved.

Figure 8:
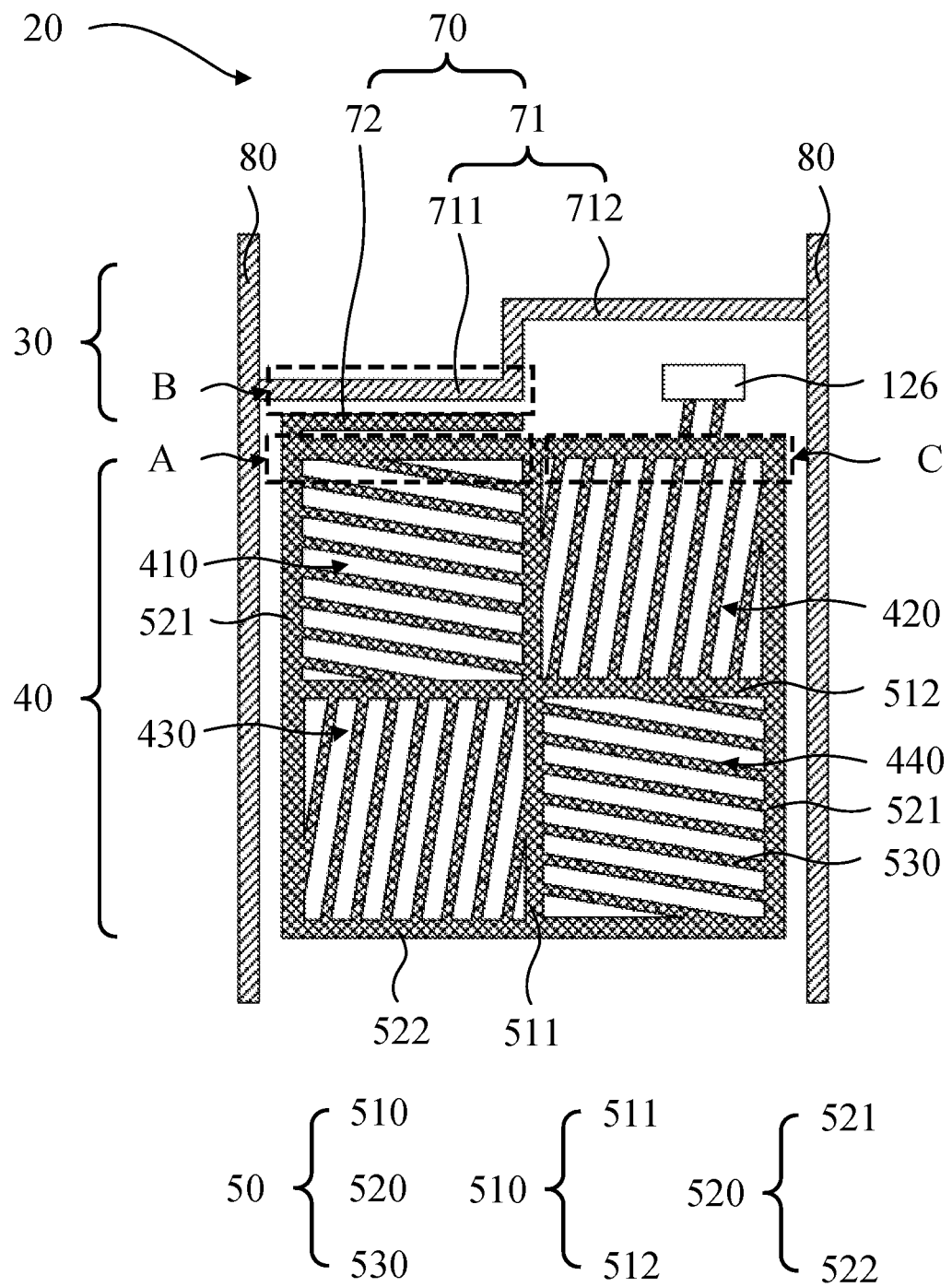
FIG. 8 is a first structural diagram of the pixel units in a third embodiment of the present application.

Please refer to FIG. 8. FIG. 8 is a first structural diagram of the pixel units 20 in a third embodiment of the present application.

The peripheral electrode 50 includes two first peripheral electrodes 521 and two second peripheral electrodes 522 disposed at periphery of the peripheral electrode 50. The two first peripheral electrodes 521 are located on two sides of the first main electrode 511 and are connected to the branch electrodes 530 in four pixel electrode sub-regions. The two second peripheral electrodes 522 are located on two sides of the second main electrode 512 and are connected to the branch electrodes 530 in four pixel electrode sub-regions.

In this embodiment, the pixel units 20 further include one second shielding line 72 composing the shielding member 70. The second shielding line 72 corresponds to one of the pixel electrode sub-regions, and the second shielding line 72 is disposed spaced apart to the branch electrodes 530 the pixel electrode sub-region 410.

In this embodiment, the second shielding line 72 corresponds to the first pixel electrode sub-region 410, and an end of the first peripheral electrodes 520 located in the first pixel electrode sub-region 410 and the third pixel electrode sub-region 430 extends toward the thin film transistor region 30 and is connected to the second shielding line 72. In addition, the structure in FIG. 8 is similar to FIG. 2. The contact hole 126 corresponds to the second pixel electrode sub-region 420. A part of the branch electrodes 530 in the second pixel electrode sub-region 420 extends toward the contact hole 126 and is connected to the thin film transistor 60.

Compared to the structure of FIG. 2, the structure illustrated in FIG. 8 is equivalent to adding one electrode parallel to the second peripheral electrode 522 in the thin film transistor region 30 to compose the second shield line 72 in this embodiment. Even though the branch electrodes 530 and the second peripheral electrodes 522 in the region A are disposed at a small angle, the second shielding line 72 shields the electric field formed by the metal layer in the region B, which weakens influence on the alignment voltage of the branch electrodes 530 in the region A, and remedies the technical problem of abnormal alignment due to inaccurate alignment voltage of the branch electrodes 530 in the region A.

Figure 9:
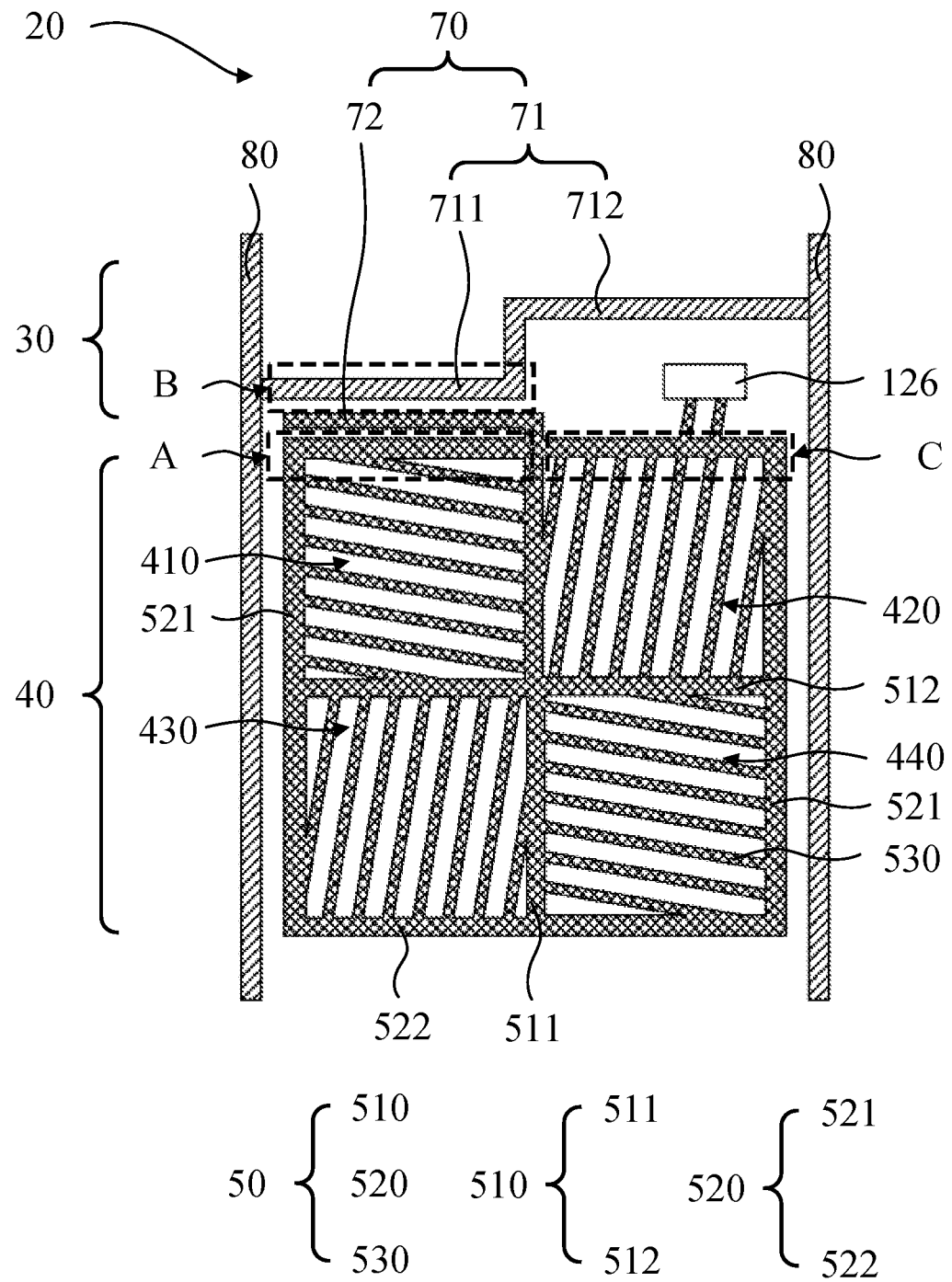
FIG. 9 is a second structural diagram of the pixel units in the third embodiment of the present application.

Please refer to FIG. 9. FIG. 9 is a second structural diagram of the pixel units 20 in the third embodiment of the present application.

The structure of FIG. 9 is similar to the structure of FIG. 8, and the difference between them is that an end of the first main electrode 511 in the pixel electrode region 40 extends toward the thin film transistor region 30 and is connected to the second shielding line 72. That is, the second shielding line 72 and the pixel electrodes 50 in FIG. 8 form an opening toward the region C, and a facing direction of an opening formed from the second shielding line 72 and the pixel electrodes 50 in FIG. 9 is opposite to the embodiment in FIG. 8.

Figure 10:
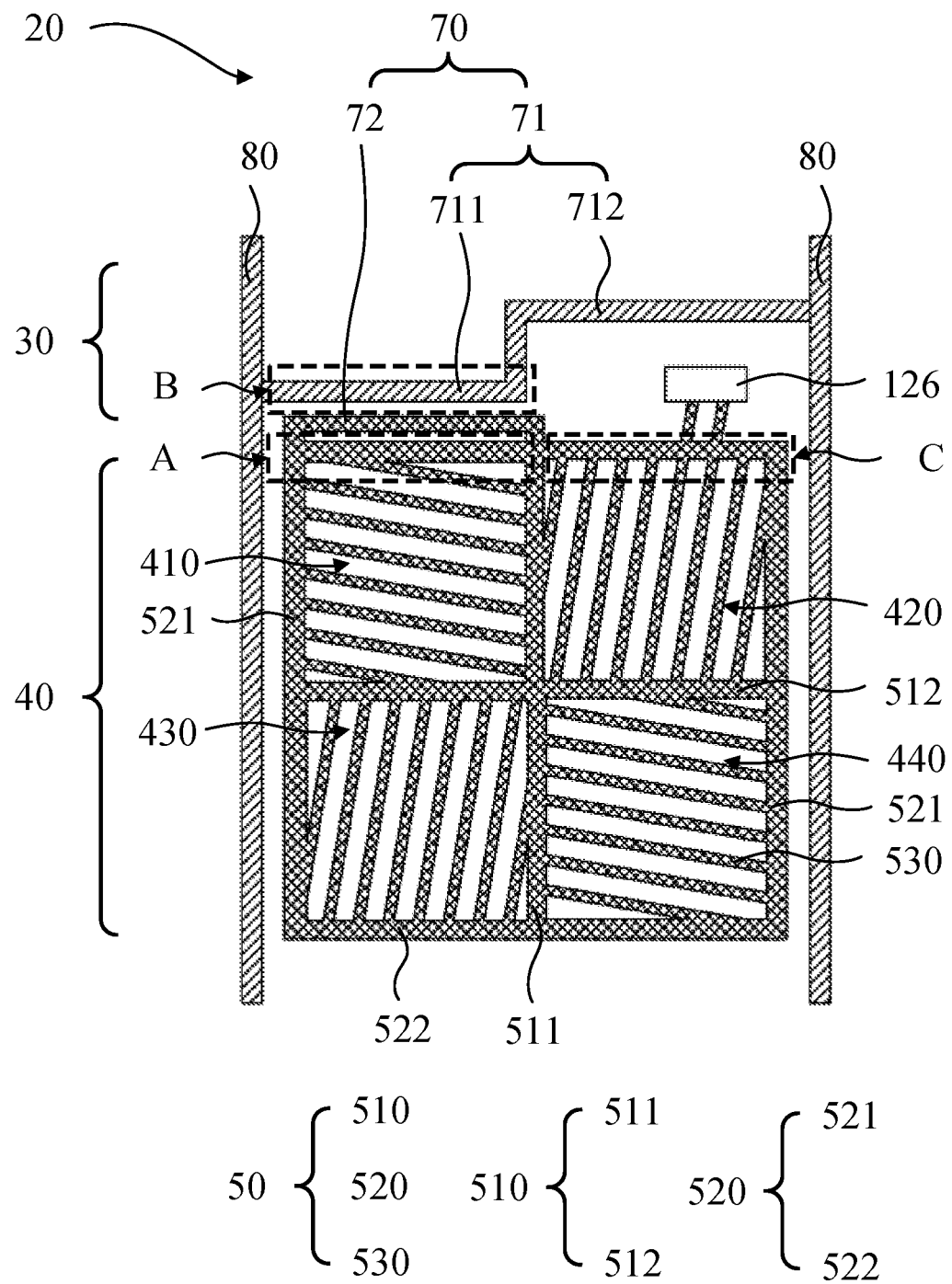
FIG. 10 is a third structural diagram of the pixel units in the third embodiment of the present application.

Please refer to FIG. 10. FIG. 10 is a third structural diagram of the pixel units 20 in the third embodiment of the present application.

The structure of FIG. 10 is similar to the structures of FIG. 8 and FIG. 9, and the difference between them is that an end of the first peripheral electrode 521 located in the first pixel electrode sub-region 410 and the third pixel electrode sub-region 430 extends toward the thin film transistor region 30 and is connected to the second shielding line 72, and an end of the first main electrode 511 in the pixel electrode region 40 extends toward the thin film transistor region 30 and is connected to the second shielding line 72. The second shielding line 72 and extension lines of the first main electrode 511 and the first peripheral electrode 521 form a closed loop.

In this embodiment, the structures in FIG. 9 and FIG. 10 are similar to the structure in FIG. 8. The second shielding lines 72 can shield the electric field formed from the metal layer in the region B, which remedies the technical problem of abnormal alignment due to inaccurate alignment voltage of the branch electrodes 530 in the region A.

Similarly, the pixel units 20 can further include a plurality of second shielding lines 72 (not shown in the figure) composing the shielding member 70, and two adjacent second shielding lines 72 can be disposed in parallel. By disposing the plurality of second shielding line 72, the influence of the metal layer in the region B on the voltage of the branch electrodes 530 in the region A can be further reduced.

Figure 11:
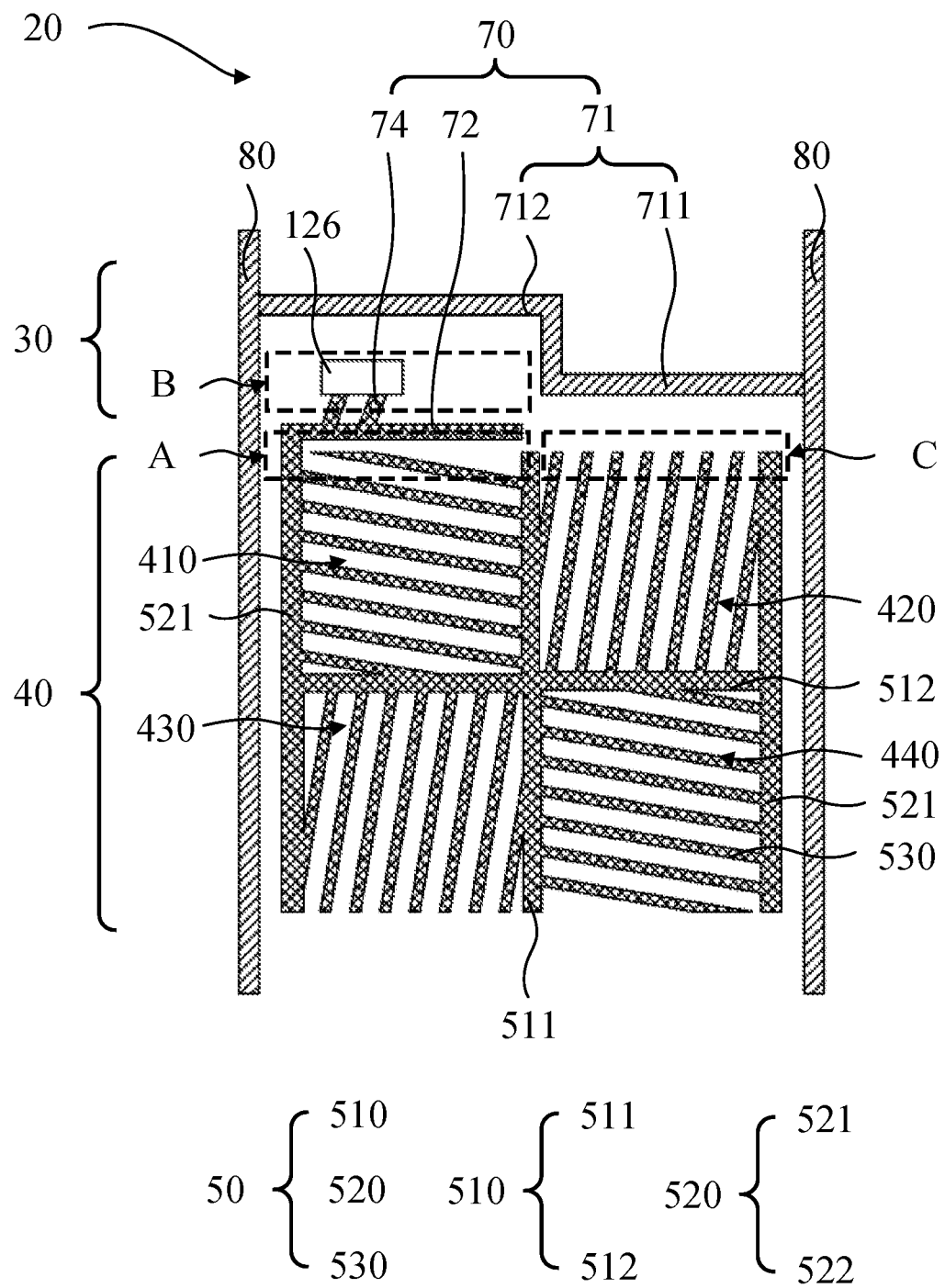
FIG. 11 is a first structural diagram of the pixel units in a fourth embodiment of the present application.

Please refer to FIG. 11. FIG. 11 is a first structural diagram of the pixel units 20 in a fourth embodiment of the present application.

The peripheral electrode 50 includes two first peripheral electrodes 521 disposed at periphery of the peripheral electrode 50. The two first peripheral electrodes 521 are located on two sides of the first main electrode 511 and are connected to the branch electrodes 530 in four pixel electrode sub-regions.

In this embodiment, the pixel units 20 further include at least one second shielding line 72 composing the shielding member 70, the second shielding line 72 corresponds to one of the pixel electrode sub-regions, and the second shielding line 72 is disposed spaced apart to the branch electrodes 530 in the first pixel electrode sub-region 410.

In this embodiment, the pixel units 20 further include a plurality of second shielding leads 74 composing the shielding member 70, one end of the second shielding leads 74 is connected to the second shielding line 72, and another end of the second shielding leads 74 extends to a contact hole 126 in the thin film transistor 60 and is connected to the thin film transistor 60. Wherein, an end of the first peripheral electrodes 521 located in the first pixel electrode sub-region 410 and the third pixel electrode sub-region 430 extends toward the thin film transistor region 30 and is connected to the second shielding line 72.

Compared to the structure in FIG. 8, the structure illustrated in FIG. 11 is equivalent to removing the second peripheral electrode 522 in the pixel electrode region 40, which prevents the branch electrodes 530 and the peripheral electrodes 520 in the region A from being disposed at a small angle and improves the appearance of the branch electrodes 530 in the region A. In addition, by disposing the second shielding lines 72 and the plurality of second shielding leads 74, the electric field formed from the metal layer in the region B is shielded, influence on the alignment voltage of the branch electrode 530 in the region A is weakened, and the technical problem of abnormal alignment due to inaccurate alignment voltage of the branch electrodes 530 in the region A is remedied.

In addition, because influence of the metal layer in the region B on the branch electrode 530 in the region A is greatest, on the basis of FIG. 8, only removing the peripheral electrode 520 in the region A and retaining the peripheral electrode 520 in the second pixel electrode sub-region 420, the third pixel electrode sub-region 430, and the fourth pixel electrode sub-region 440 are allowed.

Figure 12:
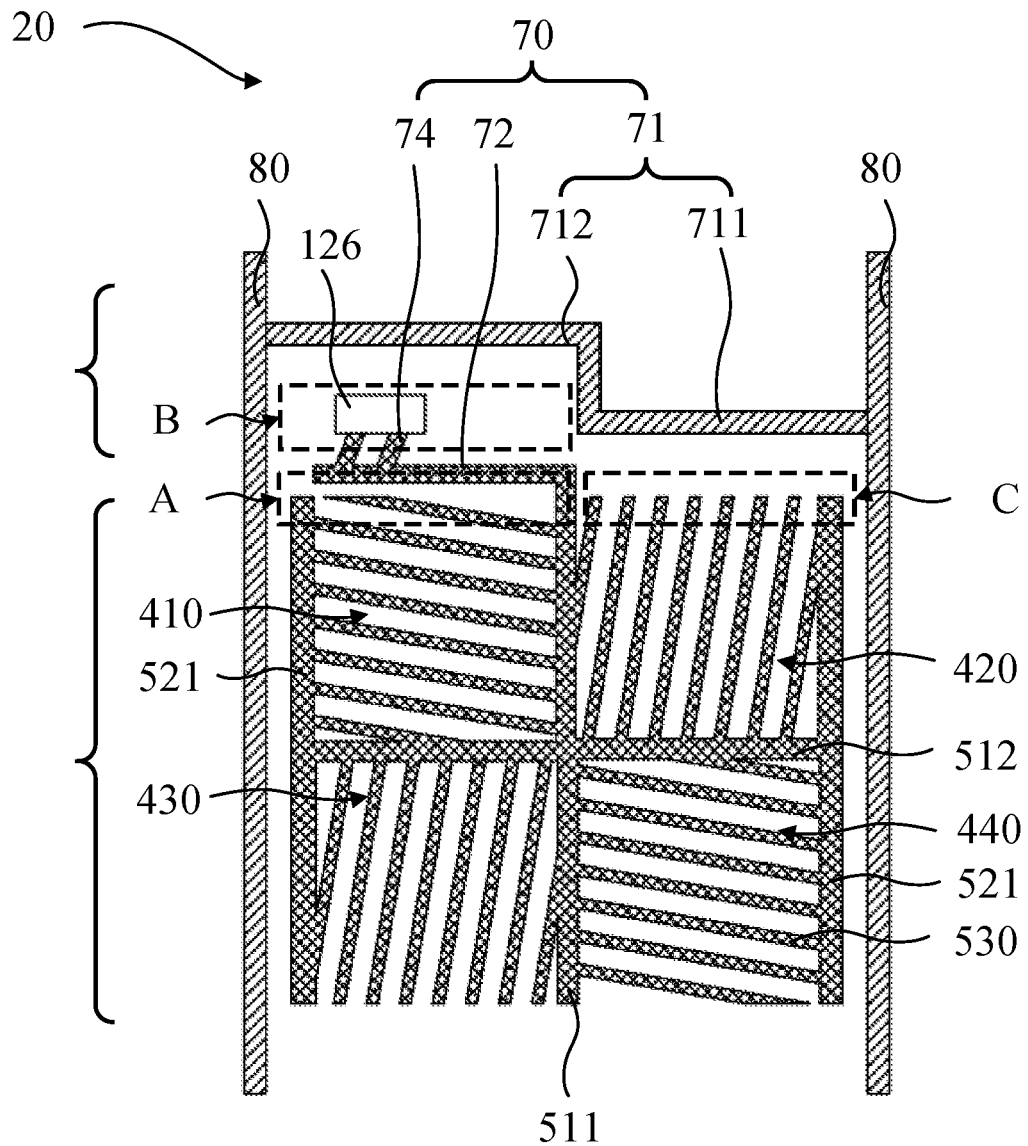
FIG. 12 is a second structural diagram of the pixel units in the fourth embodiment of the present application.

Please refer to FIG. 12. FIG. 12 is a second structural diagram of the pixel units 20 in a fourth embodiment of the present application.

The structure of FIG. 12 is similar to the structure of FIG. 11, and the difference between them is that an end of the first main electrode 511 in the pixel electrode region 40 extends toward the thin film transistor region 30 and is connected to the second shielding line 72. That is, the second shielding line 72 and the pixel electrodes 50 in FIG. 11 form an opening toward the region C, and a facing direction of an opening formed from the second shielding line 72 and the pixel electrodes 50 in FIG. 12 is opposite to the embodiment in FIG. 11.

Figure 13:
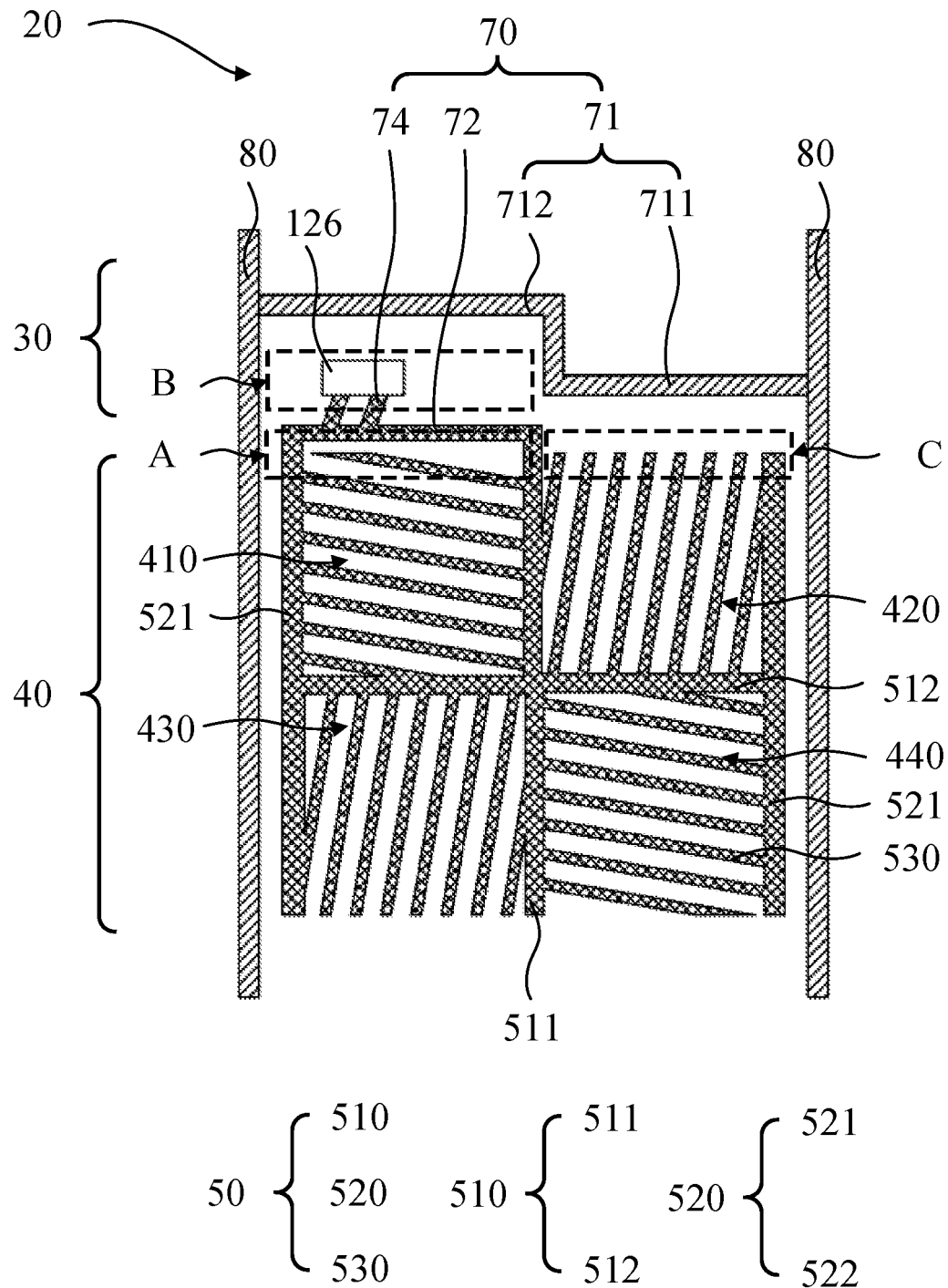
FIG. 13 is a third structural diagram of the pixel units in the fourth embodiment of the present application.

Please refer to FIG. 13. FIG. 13 is a third structural diagram of the pixel units 20 in a fourth embodiment of the present application.

The structure of FIG. 13 is similar to the structures of FIG. 11 and FIG. 12, and the difference between them is that an end of the first peripheral electrode 521 located in the first pixel electrode sub-region 410 and the third pixel electrode sub-region 430 extends toward the thin film transistor region 30 and is connected to the second shielding line 72, and an end of the first main electrode 511 in the pixel electrode region 40 extends toward the thin film transistor region 30 and is connected to the second shielding line 72. The second shielding line 72 and extension lines of the first main electrode 511 and the first peripheral electrode 521 form a closed loop.

In this embodiment, the structures in FIG. 12 and FIG. 13 are similar to the structure in FIG. 11. Both of them can prevent the branch electrodes 530 and the peripheral electrode 520 in the region A being disposed at a small angle, can remedy the appearance of the branch electrodes 530 in the region A, and can shield the electric field formed from the metal layer in the region B, which remedies the technical problem of abnormal alignment due to inaccurate alignment voltage of the branch electrodes 530 in the region A.

Figure 14:
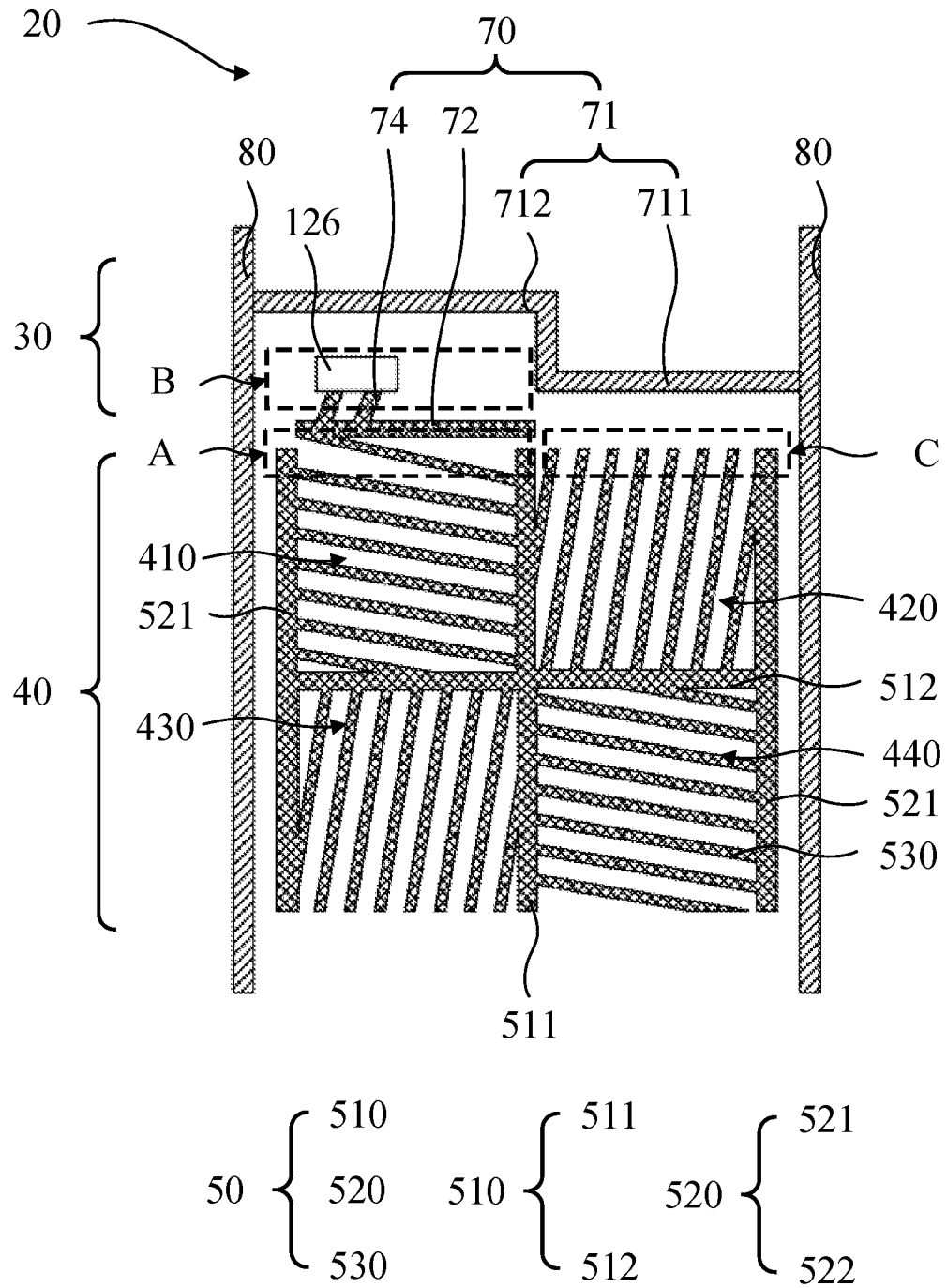
FIG. 14 is a fourth structural diagram of the pixel units in the fourth embodiment of the present application.

Please refer to FIG. 14. FIG. 14 is a fourth structural diagram of the pixel units 20 in the fourth embodiment of the present application.

An end of a part of the branch electrode 530 located in the first pixel electrode sub-region 410 extends toward the thin film transistor region 30 and is connected to the second shielding line 72. Compared to the structures of FIG. 11 and FIG. 13, the second shielding line 72 and the first peripheral electrode 521 separate from the first main electrode 511, and the second shielding line 72 is connected to part of the branch electrodes 530 in the first pixel electrode sub-region 410.

In this embodiment, part of the branch electrodes 530 and the second shielding line 72 in the first pixel electrode sub-region 410 are disposed at a small angle. Because a region where the branch electrodes 530 and the second shield line 72 are disposed at the small angle is located in the thin film transistor region 30, the abnormality of the region is blocked by a corresponding light shielding material, such as black light shielding adhesive or metal. Therefore, even if an abnormal alignment region appears in this embodiment, the pixel electrodes 50 in the light transmissive region are affected little. In addition, the extension lines of the branch electrodes 530, the second shielding line 72, and the second shielding leads 74 have certain voltages, which can shield the electric field formed from the metal layer in the region B, can weaken influence on the alignment voltage of the branch electrodes 530 in the region A, and can remedy the technical problem of abnormal alignment due to inaccurate alignment voltage of the branch electrodes 530 in the region A.

Figure 15:
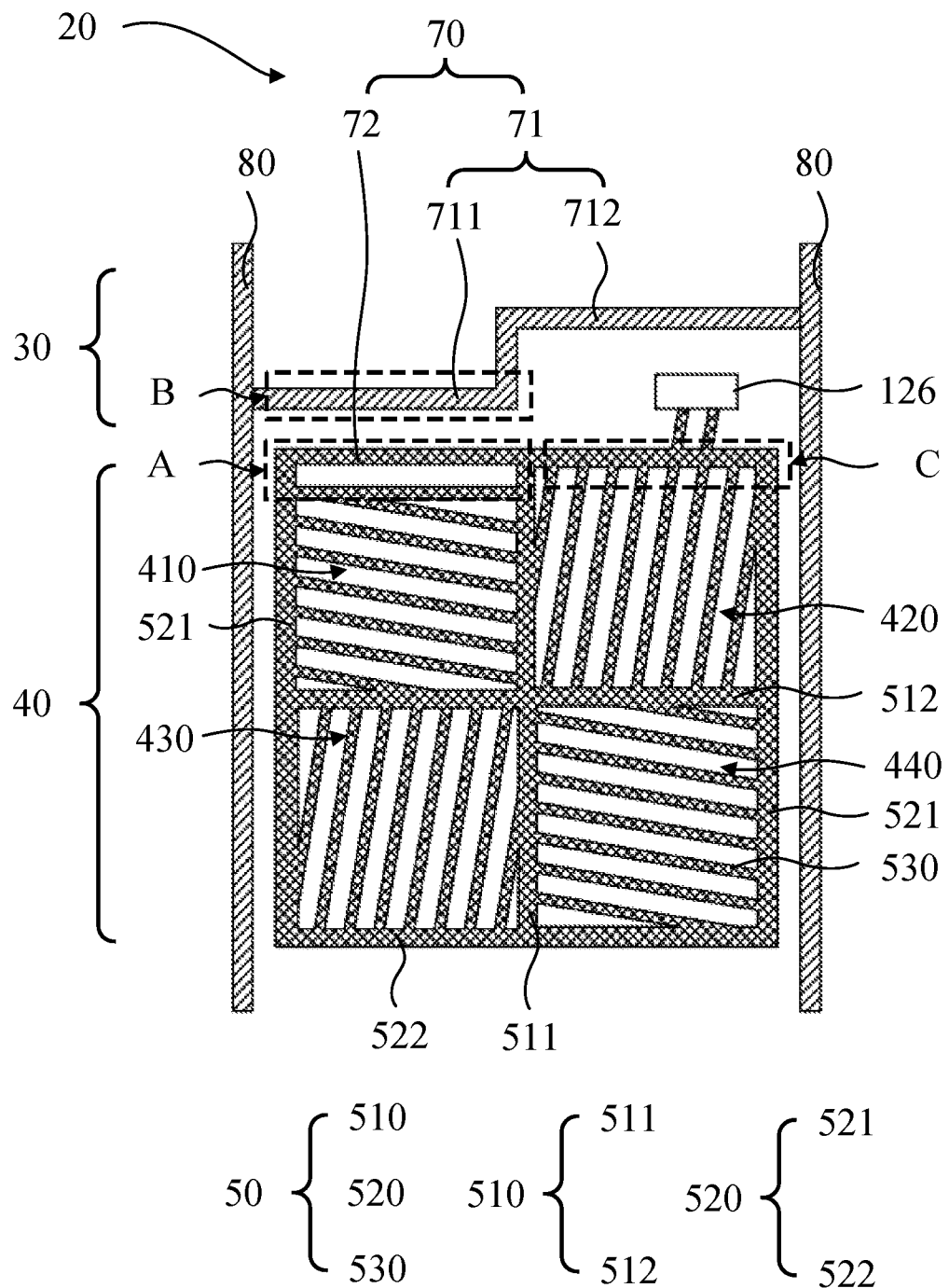
FIG. 15 is a structural diagram of the pixel units in a fifth embodiment of the present application.

Please refer to FIG. 15. FIG. 15 is a first structural diagram of the pixel units 20 in a fifth embodiment of the present application.

The peripheral electrode 50 can include two first peripheral electrodes 521 and two second peripheral electrodes 522 disposed at periphery of the peripheral electrode 50. The two first peripheral electrodes 521 are located on two sides of the first main electrode 511 and are connected to the branch electrodes 530 in four pixel electrode sub-regions. The two second peripheral electrodes 522 are connected to the branch electrodes 530 in the third electrode sub-region 430 and the fourth pixel electrode sub-region 440. Wherein, intervals between the second peripheral electrodes 522 and the second main electrode 512 in two adjacent pixel electrode sub-regions are different, i.e., the second peripheral electrode 522 disposed in the first pixel electrode sub-region 410 and the second peripheral electrode 522 disposed in the second pixel electrode sub-region 420 are not on a same straight line.

In this embodiment, the pixel units 20 can further include at least one second shielding line 72 composing the shielding member 70, the second shielding line 72 corresponds to one of the pixel electrode sub-regions, and the second shielding line 72 is disposed spaced apart to the branch electrodes 530 in the first pixel electrode sub-region 410. Wherein, the second shielding line 72 is disposed at a border of the thin film transistor region 30 and the pixel electrode 40, the second shielding line 72 and the second peripheral electrode 522 are disposed in parallel and are disposed on a same line with the second peripheral electrode 522 in the second pixel electrode sub-region 420, and the second shielding line 72 can be connected or not connected to the second peripheral electrode 522 in the second pixel electrode sub-region 420. In the structure disclosed in FIG. 15, the second shielding line 72 and the second peripheral electrode 522 in the second pixel electrode sub-region are disposed in connection.

Please refer to FIG. 15. Compared to the structure of FIG. 8, in this embodiment, the structure in the region A is moved down, and the presence of the second shielding lines 72 increases the interval between the region A and the region B, weakens influence on the alignment voltage of the branch electrode 530 in the region A, and remedies the technical problem of abnormal alignment due to inaccurate alignment voltage of the branch electrodes 530 in the region A.

In embodiments hereinafter, the technical solution of the present application is described by taking the pixel electrode with 8-domain partitions as an example.

Figure 16:
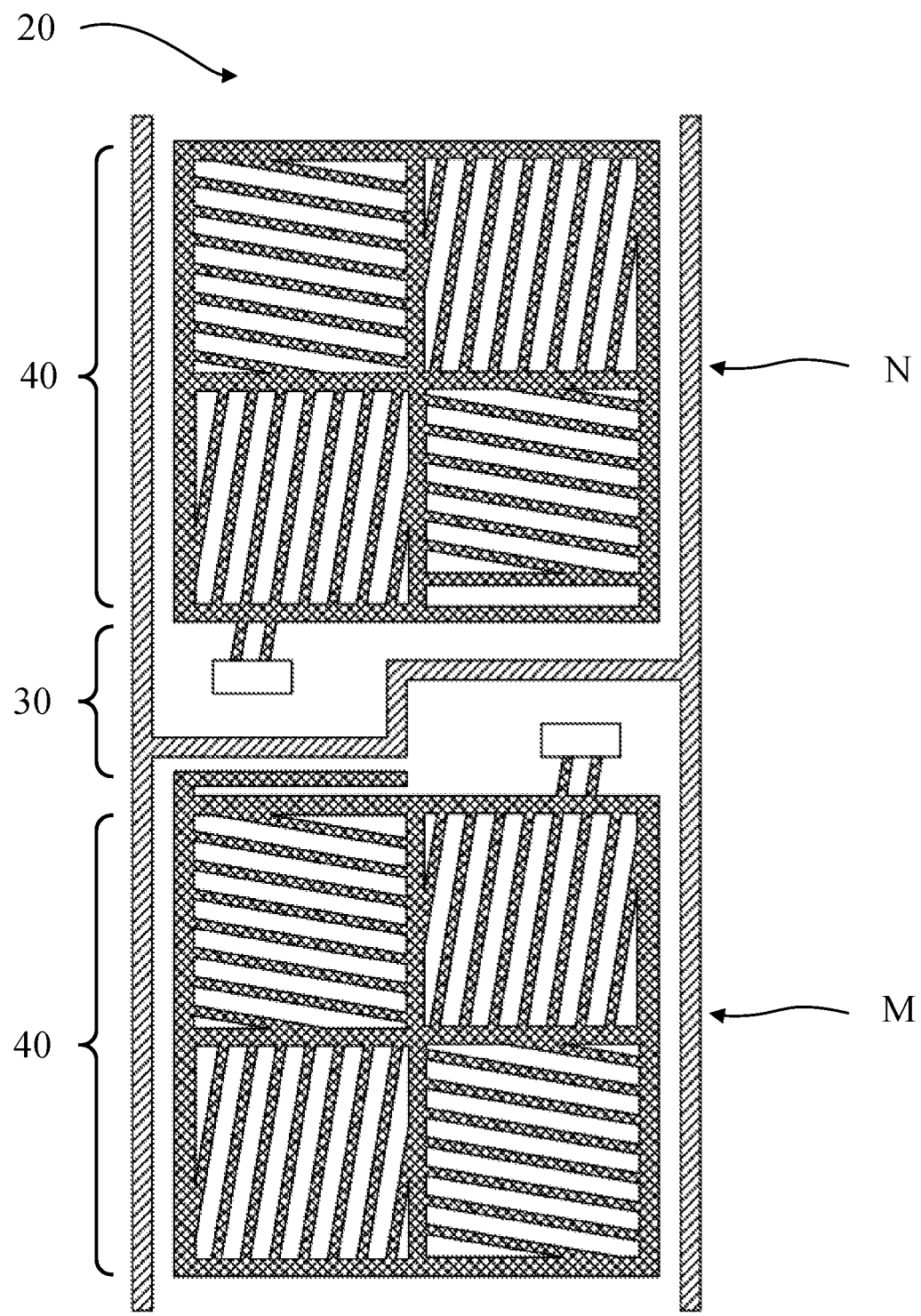
FIG. 16 is a structural diagram of the pixel units in a sixth embodiment of the present application.

Please refer to FIG. 16. FIG. 16 is a first structural diagram of the pixel units 20 in a sixth embodiment of the present application.

The pixel units 20 can include a thin film transistor region 30 and the pixel electrode regions 40 located on two sides of the thin film transistor region 30. The structures of the pixel electrodes 50 in the two pixel electrode regions 40 in the same pixel unit 20 can be same or different. The structure of the pixel electrode 50 in any one of the pixel electrode regions 40 can be same as the structure of the pixel electrode 50 with 4-domain partitions in the aforesaid first embodiment to fifth embodiment.

In FIG. 16, the structures of the pixel electrodes 50 in the two pixel electrode regions 40 are different, i.e., the structures of the pixel electrode 50 in the region M and the region N are different. In FIG. 16, the structure of the pixel electrode in the region M can be same as the structure of the pixel electrode in FIG. 8, and the structure of the pixel electrode in the region N can be same as the structure of the pixel electrode in FIG. 15. Redundant description is not mentioned herein again.

The present application further provides a display panel. The display panel includes an array substrate, a color film substrate, and a liquid crystal layer located between the array substrate and the color film substrate. Working principle of the display panel is same as or similar to working principle of the aforesaid array substrate.

The present application further provides a mobile terminal. The mobile terminal includes a terminal host and the aforesaid display panel. The terminal host and the display panel are combined in one piece. Working principle of the mobile terminal is same as or similar to working principle of the display panel. The mobile terminal can be, but is limited to a mobile phone, a computer, a notebook, etc.

The present application provides an array substrate and a display panel. The array substrate includes a plurality of scanning lines and a plurality of data lines. A plurality of pixel units are enclosed by the plurality of scanning lines and the plurality of data lines. The pixel units include a thin film transistor region and pixel electrode regions, thin film transistors disposed in the thin film transistor region, and pixel electrodes disposed in the pixel electrode regions. The pixel electrode is electrically connected to the thin film transistor. Meanwhile, the shielding member is further disposed in the thin film transistor layer in the present application, and the interval between the shielding member and the pixel electrode in an extending direction of the data line is the first threshold value, which allows the shielding member to shield a voltage of a metal layer in the thin film transistor disposed close to the pixel electrode region, prevents the metal layer of the thin film transistor from affecting an alignment voltage of the pixel electrode, and remedies the technical problem of abnormal alignment of the pixel electrode in the region due to inaccurate alignment voltage.

It can be understood, that for those of ordinary skill in the art, various other corresponding changes and modifications can be made according to the technical solutions and technical ideas of the present application, and all such changes and modifications are intended to fall within the scope of protection of the claims of the present application.

What is claimed is:

1. An array substrate, wherein the array substrate comprises a plurality of scanning lines and a plurality of data lines, a plurality of pixel units are enclosed by the plurality of scanning lines and the plurality of data lines, the pixel units comprise a thin film transistor region and pixel electrode regions;
   the pixel units comprise a thin film transistor layer disposed in the thin film transistor region and a pixel electrode layer disposed in the pixel electrode regions; the pixel electrode layer comprises a pixel electrode, the thin film transistor layer comprises a thin film transistor, and the pixel electrode is electrically connected to the thin film transistor; and
   wherein the pixel units further comprise a shielding member disposed in the thin film transistor region, in a first direction, an interval between the shielding member and the pixel electrode is a first threshold value, and the first direction is parallel to an extending direction of the data lines.

2. The array substrate as claimed in claim 1, wherein the pixel electrode comprises a main electrode and a plurality of branch electrodes connected to the main electrode, the main electrode comprises a first main electrode and a second main electrode, the first main electrode and the second main electrode separate the pixel electrode regions into a plurality of pixel electrode sub-regions, the branch electrodes are disposed in the pixel electrode sub-regions, each of the branch electrodes is disposed with the first main electrode or the second main electrode at a first preset angle; and
   wherein the branch electrodes in two adjacent pixel electrode sub-regions are disposed asymmetrically.

3. The array substrate as claimed in claim 2, wherein the array substrate further comprises a plurality of shielding main lines located on the data lines, the shielding main lines are disposed parallel to the data lines, one of the shielding main lines corresponds to one of the data lines; and
   wherein the shielding member comprises a first shielding line connected to two adjacent shielding main lines, and in the first direction, an interval between the first shielding line and the pixel electrode is the first threshold value.

4. The array substrate as claimed in claim 3, wherein the pixel electrode further comprises peripheral electrodes located on a periphery of the pixel electrodes, the peripheral electrodes are connected to the first main electrode, the second main electrode, and the branch electrodes; and
   wherein the shielding member extends toward the pixel electrode regions and is electrically connected to at least one of the peripheral electrodes, the main electrode, or the branch electrodes.

5. The array substrate as claimed in claim 4, wherein the pixel electrode comprises at least one first peripheral electrode disposed along the extending direction of the data lines;
   the shielding member comprises a plurality of first shielding leads, one end of the first shielding leads extends toward the pixel electrode regions and is connected to the branch electrodes and the first peripheral electrode, another end of the first shielding leads extends to a contact hole in the thin film transistor and is connected to the thin film transistor.

6. The array substrate as claimed in claim 4, wherein the pixel electrode comprises at least one first peripheral electrode disposed along the extending direction of the data lines,
   the shielding member comprises a second shielding line disposed along an extending direction of the scanning lines, the second shielding line corresponds to one of the pixel electrode sub-regions, and the second shielding line is disposed spaced apart to the branch electrodes in a corresponding pixel electrode sub-region; and
   wherein at least one end of one of the first peripheral electrodes or one of the first main electrode extend to the thin film transistor region and are connected to the second shielding line.

7. The array substrate as claimed in claim 6, wherein the shielding member comprises a plurality of second shielding leads, one end of the second shielding leads is connected to the second shielding line, another end of the second shielding leads extends to the contact hole in the thin film transistor and is connected to the thin film transistor.

8. The array substrate as claimed in claim 6, wherein the pixel electrode comprises at least one second peripheral electrode disposed along the extending direction of the scanning lines, the second peripheral electrode is parallel to the second shielding line; and
   wherein the second peripheral electrode is connected to at least one of the branch electrodes, the first main electrode, or the first peripheral electrode.

9. The array substrate as claimed in claim 4, wherein the pixel electrode comprises at least one second peripheral electrode disposed along an extending direction of the scanning lines, intervals between the second peripheral electrodes and the second main electrode in two adjacent pixel electrode sub-regions are different.

10. The array substrate as claimed in claim 1, wherein the pixel units comprise the pixel electrode regions located on two sides of the thin film transistor region, structures of the pixel electrodes in two of the pixel electrode regions in one same pixel electrode unit are different.

11. A display panel, wherein the display panel comprises an array substrate, a color film substrate, and a liquid crystal layer located between the array substrate and the color film substrate;

wherein the array substrate comprises a plurality of scanning lines and a plurality of data lines, a plurality of pixel units are enclosed by the plurality of scanning lines and the plurality of data lines, the pixel units comprise a thin film transistor region and pixel electrode regions;

the pixel units comprise a thin film transistor layer disposed in the thin film transistor region and a pixel electrode layer disposed in the pixel electrode regions; the pixel electrode layer comprises a pixel electrode, the thin film transistor layer comprises a thin film transistor, and the pixel electrode is electrically connected to the thin film transistor; and wherein the pixel units further comprise a shielding member disposed in the thin film transistor region, in a first direction, an interval between the shielding member and the pixel electrode is a first threshold value, and the first direction is parallel to an extending direction of the data lines.

12. The display panel as claimed in claim 11, wherein the pixel electrode comprises a main electrode and a plurality of branch electrodes connected to the main electrode, the main electrode comprises a first main electrode and a second main electrode, the first main electrode and the second main electrode separate the pixel electrode regions into a plurality of pixel electrode sub-regions, the branch electrodes are disposed in the pixel electrode sub-regions, each of the branch electrodes is disposed with the first main electrode or the second main electrode at a first preset angle; and wherein the branch electrodes in two adjacent pixel electrode sub-regions are disposed asymmetrically.

13. The display panel as claimed in claim 12, wherein the array substrate further comprises a plurality of shielding main lines located on the data lines, the shielding main lines are disposed parallel to the data lines, one of the shielding main lines corresponds to one of the data lines; and wherein the shielding member comprises a first shielding line connected to two adjacent shielding main lines, and in the first direction, an interval between the first shielding line and the pixel electrode is the first threshold value.

14. The display panel as claimed in claim 13, wherein the pixel electrode further comprises peripheral electrodes located on a periphery of the pixel electrodes, the peripheral electrodes are connected to the first main electrode, the second main electrode, and the branch electrodes; and wherein the shielding member extends toward the pixel electrode regions and is electrically connected to at least one of the peripheral electrodes, the main electrode, or the branch electrodes.

15. The display panel as claimed in claim 14, wherein the pixel electrode comprises at least one first peripheral electrode disposed along the extending direction of the data lines, the shielding member comprises a plurality of first shielding leads, one end of the first shielding leads extends toward the pixel electrode regions and is connected to the branch electrodes and the first peripheral electrode, another end of the first shielding leads extends to a contact hole in the thin film transistor and is connected to the thin film transistor.

16. The display panel as claimed in claim 14, wherein the pixel electrode comprises at least one first peripheral electrode disposed along the extending direction of the data lines, the shielding member comprises a second shielding line disposed along an extending direction of the scanning lines, the second shielding line corresponds to one of the pixel electrode sub-regions, and the second shielding line is disposed spaced apart to the branch electrodes in a corresponding pixel electrode sub-region; and wherein at least one end of one of the first peripheral electrodes or one of the first main electrode extend to the thin film transistor region and are connected to the second shielding line.

17. The display panel as claimed in claim 16, wherein the shielding member comprises a plurality of second shielding leads, one end of the second shielding leads is connected to the second shielding line, another end of the second shielding leads extends to the contact hole in the thin film transistor and is connected to the thin film transistor.

18. The display panel as claimed in claim 16, wherein the pixel electrode comprises at least one second peripheral electrode disposed along the extending direction of the scanning lines, the second peripheral electrode is parallel to the second shielding line; and wherein the second peripheral electrode is connected to at least one of the branch electrodes, the first main electrode, or the first peripheral electrode.

19. The display panel as claimed in claim 14, wherein the pixel electrode comprises at least one second peripheral electrode disposed along an extending direction of the scanning lines, intervals between the second peripheral electrodes and the second main electrode in two adjacent pixel electrode sub-regions are different.

20. The display panel as claimed in claim 11, wherein the pixel units comprise the pixel electrode regions located on two sides of the thin film transistor region, structures of the pixel electrodes in two of the pixel electrode regions in one same pixel electrode unit are different.

* * * * *